(12) United States Patent
Dannenberg et al.

(10) Patent No.: US 11,689,239 B2
(45) Date of Patent: Jun. 27, 2023

(54) OUTER CASE FOR A FOLDABLE MOBILE DEVICE

(71) Applicant: Speculative Product Design, LLC, San Mateo, CA (US)

(72) Inventors: Harlan Seth Dannenberg, San Francisco, CA (US); Monica Elizabeth Wright, Falls Church, VA (US); Christopher William Ledesma, San Francisco, CA (US); Darrick Albert Del Moral, San Bruno, CA (US); Bryan Lee Hynecek, Redwood City, CA (US)

(73) Assignee: Speculative Product Design, LLC, San Mateo, CA (US)

( * ) Notice: Subject to any disclaimer, the term of this patent is extended or adjusted under 35 U.S.C. 154(b) by 0 days.

(21) Appl. No.: 17/532,520

(22) Filed: Nov. 22, 2021

(65) Prior Publication Data

US 2022/0166456 A1    May 26, 2022

Related U.S. Application Data

(60) Provisional application No. 63/231,513, filed on Aug. 10, 2021, provisional application No. 63/117,161, filed on Nov. 23, 2020.

(51) Int. Cl.
*H04M 1/00* (2006.01)
*H04B 1/3888* (2015.01)
(Continued)

(52) U.S. Cl.
CPC .......... *H04B 1/3888* (2013.01); *H04M 1/022* (2013.01); *H04M 1/0268* (2013.01); *H04M 1/04* (2013.01)

(58) Field of Classification Search
CPC .. H04B 1/3888; H04M 1/022; H04M 1/0268; H04M 1/04; H04M 1/0216
See application file for complete search history.

(56) References Cited

U.S. PATENT DOCUMENTS 6,109,434 A    8/2000  Howard, Jr.
6,201,867 B1   3/2001  Koike
(Continued)

FOREIGN PATENT DOCUMENTS

KR    200387446 Y1    6/2005
WO    2007079494 A2   7/2007

OTHER PUBLICATIONS

Smith, J. "Review: Speck CandyShell iPad Case Protects and Connects;" Apr. 27, 2010, retrieved from the Internet <https://notebooks.com/tag/speck-candyshell-ipad-case/> [retrieved Jul. 20, 2021], 12 pgs.

(Continued)

*Primary Examiner* — Nhan T Le
(74) *Attorney, Agent, or Firm* — Lerner David LLP

(57) ABSTRACT

A foldable case is configured for removably receiving a separate and distinct mobile electronic device having a front device surface, a rear device surface opposite the front device surface, and a periphery extending between the front device surface and the rear device surface. The case includes first and second cover members and opposing hinge members. The first and second cover members include respective first and second rear walls, respective first and second peripheral rims, and respective first and second sidewalls extending between the respective rear walls and the respective peripheral rims and thereby define respective first and second recesses configured for receiving respective first and second portions of the device. The opposing hinge members each extend between adjacent locations at the respective (Continued)

peripheral rims of the first and the second cover members to hingedly connect the first and the second cover members.

27 Claims, 16 Drawing Sheets

(51) Int. Cl.
*H04M 1/02* (2006.01)
*H04M 1/04* (2006.01)

(56) References Cited

U.S. PATENT DOCUMENTS

| | | | |
|---|---|---|---|
| D448,368 S | 9/2001 | Bettag et al. |
| 6,646,864 B2 | 11/2003 | Richardson |
| 6,772,879 B1 | 8/2004 | Domotor |
| 6,785,566 B1 | 8/2004 | Irizarry |
| 6,980,777 B2 | 12/2005 | Shepherd et al. |
| 6,995,976 B2 | 2/2006 | Richardson |
| 7,032,984 B2 | 4/2006 | Kim et al. |
| 7,158,376 B2 | 1/2007 | Richardson et al. |
| 7,180,735 B2 | 2/2007 | Thomas et al. |
| 7,194,291 B2 | 3/2007 | Peng |
| 7,343,184 B2 | 3/2008 | Rostami |
| 7,366,555 B2 | 4/2008 | Jokinen et al. |
| 7,418,278 B2 | 8/2008 | Eriksson et al. |
| 7,444,176 B2 | 10/2008 | Oda et al. |
| 7,515,708 B1 | 4/2009 | Doty, III et al. |
| 7,609,512 B2 | 10/2009 | Richardson et al. |
| 7,641,046 B2 | 1/2010 | Tsang et al. |
| 7,663,879 B2 | 2/2010 | Richardson et al. |
| 7,673,745 B2 | 3/2010 | Sirichai et al. |
| 7,711,400 B2 | 5/2010 | Nuovo |
| 7,775,354 B2 | 8/2010 | Latcliford et al. |
| 7,778,026 B2 | 8/2010 | Mitchell |
| 7,822,449 B2 | 10/2010 | Uramoto et al. |
| 7,933,122 B2 | 4/2011 | Richardson et al. |
| 7,941,195 B2 | 5/2011 | Peng |
| 7,988,010 B2 | 8/2011 | Yang et al. |
| 8,028,794 B1 | 10/2011 | Freeman |
| 8,073,131 B2 | 12/2011 | Bodkin et al. |
| 8,342,325 B2 | 1/2013 | Rayner |
| 8,359,078 B2 | 1/2013 | Hung |
| 8,395,894 B2 | 3/2013 | Richardson et al. |
| 8,418,852 B2 | 4/2013 | Ziemba |
| 8,631,934 B2 | 1/2014 | Chun |
| 8,695,798 B2 | 4/2014 | Simmer |
| 8,714,299 B2 | 5/2014 | Richardson et al. |
| 8,718,731 B1 | 5/2014 | Tang |
| 8,755,852 B2 | 6/2014 | Hynecek et al. |
| 8,792,232 B2 | 7/2014 | Richardson |
| 8,837,142 B2 | 9/2014 | McEwan et al. |
| RE45,179 E | 10/2014 | Bodkin et al. |
| 8,919,549 B1 | 12/2014 | Tashjian |
| 8,965,458 B2 | 2/2015 | Richardson et al. |
| 8,976,512 B2 | 3/2015 | Richardson et al. |
| 9,025,317 B2 | 5/2015 | Richardson et al. |
| 9,173,314 B2 | 10/2015 | Richardson et al. |
| 9,277,804 B1 | 3/2016 | Gennodie |
| 9,287,916 B2 | 3/2016 | Wicks et al. |
| 9,295,174 B2 | 3/2016 | Witter et al. |
| 9,300,344 B2 | 3/2016 | Rayner |
| 9,462,865 B2 | 10/2016 | Takayama et al. |
| 9,480,319 B2 | 11/2016 | Dining et al. |
| 9,498,033 B2 | 11/2016 | Richardson et al. |
| 9,503,147 B2 | 11/2016 | Witter et al. |
| 9,591,904 B2 | 3/2017 | Park et al. |
| 9,596,332 B2 | 3/2017 | Gander et al. |
| 9,674,975 B2 | 6/2017 | Carnevali |
| 9,703,330 B2 | 7/2017 | Johnson et al. |
| 9,735,595 B2 | 8/2017 | Colahan et al. |
| 9,851,759 B2 | 12/2017 | Tazbaz et al. |
| 9,871,550 B2 | 1/2018 | Witter et al. |
| 9,872,545 B2 | 1/2018 | Sartee et al. |
| 9,888,753 B2 | 2/2018 | Richardson et al. |
| 9,927,841 B2 | 3/2018 | Gheorghiu et al. |
| 9,961,431 B2 | 5/2018 | McPeak et al. |
| 9,986,805 B2 | 6/2018 | Northrup et al. |
| 10,016,039 B2 | 7/2018 | Johnson et al. |
| 10,064,298 B2 | 8/2018 | Cavenagh et al. |
| 10,097,676 B2 | 10/2018 | Peng |
| 10,103,769 B2 | 10/2018 | Witter et al. |
| 10,136,716 B2 | 11/2018 | Northrup et al. |
| 10,206,472 B1 | 2/2019 | Northrup et al. |
| 10,258,127 B2 | 4/2019 | Johnson et al. |
| 10,292,285 B2 | 5/2019 | Cavenagh et al. |
| 10,314,185 B2 | 6/2019 | Cavenagh et al. |
| 10,340,970 B2 | 7/2019 | Richardson et al. |
| 10,362,846 B2 | 7/2019 | Denike et al. |
| 10,411,749 B2 | 9/2019 | Witter et al. |
| 10,492,318 B2 | 11/2019 | Cavenagh et al. |
| D877,136 S | 3/2020 | Lee |
| D879,084 S | 3/2020 | Lee |
| D879,764 S | 3/2020 | Lee |
| 10,577,151 B2 | 3/2020 | Rizzuto |
| 10,627,856 B1 | 4/2020 | Chang |
| 10,694,825 B2 | 6/2020 | Hynecek et al. |
| D896,214 S | 9/2020 | Lee |
| 10,790,869 B1 | 9/2020 | Loh et al. |
| D899,412 S | 10/2020 | Lee |
| 10,816,124 B2 | 10/2020 | Molineux |
| 10,827,809 B2 | 11/2020 | Skahan |
| 10,849,241 B2 | 11/2020 | Cavenagh et al. |
| D903,621 S | 12/2020 | Kim et al. |
| D905,675 S | 12/2020 | Lee |
| 10,849,398 B2 | 12/2020 | Armstrong |
| 10,873,654 B2 | 12/2020 | Liu |
| D910,004 S | 2/2021 | Lee |
| 10,905,213 B2 | 2/2021 | Johnson et al. |
| D915,385 S | 4/2021 | Lee |
| 11,121,735 B2 * | 9/2021 | Kim ............... H04M 1/185 |
| 11,275,410 B1 * | 3/2022 | Hosokai ............ G06F 1/1647 |
| 2002/0017545 A1 | 2/2002 | Badillo et al. |
| 2002/0104769 A1 | 8/2002 | Kim et al. |
| 2002/0137475 A1 | 9/2002 | Shou et al. |
| 2004/0262179 A1 | 12/2004 | Gartrell et al. |
| 2005/0045505 A1 | 3/2005 | Vandevenne et al. |
| 2006/0160586 A1 | 7/2006 | Cheng |
| 2006/0175370 A1 | 8/2006 | Arney et al. |
| 2006/0208020 A1 | 9/2006 | Albert et al. |
| 2006/0274493 A1 | 12/2006 | Richardson et al. |
| 2007/0019804 A1 | 1/2007 | Kramer |
| 2007/0060224 A1 | 3/2007 | Liu |
| 2007/0201689 A1 | 8/2007 | Uramoto et al. |
| 2007/0205122 A1 | 9/2007 | Oda et al. |
| 2007/0235492 A1 | 10/2007 | Sirichai et al. |
| 2007/0241012 A1 | 10/2007 | Latcliford et al. |
| 2008/0053851 A1 | 3/2008 | Ko et al. |
| 2008/0121321 A1 | 5/2008 | Tiner et al. |
| 2008/0220834 A1 | 9/2008 | Sofoulis |
| 2008/0316687 A1 | 12/2008 | Richardson et al. |
| 2010/0203931 A1 | 8/2010 | Hynecek et al. |
| 2010/0300909 A1 | 12/2010 | Hung |
| 2011/0089078 A1 | 4/2011 | Ziemba |
| 2011/0228458 A1 | 9/2011 | Richardson et al. |
| 2011/0277892 A1 | 11/2011 | Black |
| 2012/0031788 A1 | 2/2012 | Mongan et al. |
| 2012/0088557 A1 | 4/2012 | Liang |
| 2012/0325723 A1 | 12/2012 | Carnevali |
| 2013/0015081 A1 | 1/2013 | Wu |
| 2013/0098789 A1 | 4/2013 | Jun et al. |
| 2013/0127308 A1 | 5/2013 | Yang |
| 2013/0214661 A1 | 8/2013 | McBroom |
| 2014/0202887 A1 | 7/2014 | Mongan et al. |
| 2014/0262875 A1 | 9/2014 | Carnevali |
| 2015/0195938 A1 | 7/2015 | Witter et al. |
| 2015/0214991 A1 | 7/2015 | Ranchod et al. |
| 2016/0187935 A1 | 6/2016 | Tazbaz et al. |
| 2016/0299532 A1 | 10/2016 | Gheorghiu et al. |
| 2016/0381014 A1 | 12/2016 | Kim |
| 2017/0013923 A1 | 1/2017 | Johnson et al. |
| 2017/0123217 A1 | 5/2017 | Dukerschein et al. |
| 2017/0188675 A1 | 7/2017 | Ahmed et al. |
| 2018/0139857 A1 | 5/2018 | Cavenagh et al. |

(56) References Cited

U.S. PATENT DOCUMENTS

| | | | |
|---|---|---|---|
| 2018/0348817 A1 | 12/2018 | Armstrong |
| 2018/0352924 A1 | 12/2018 | Lim |
| 2018/0375542 A1 | 12/2018 | Igarashi |
| 2019/0075899 A1 | 3/2019 | Hynecek et al. |
| 2019/0075900 A1 | 3/2019 | Hynecek et al. |
| 2019/0081299 A1 | 3/2019 | Chiang et al. |
| 2020/0174522 A1 | 6/2020 | Lim |
| 2020/0229566 A1 | 7/2020 | Mody |
| 2020/0281337 A1 | 9/2020 | Lee et al. |
| 2020/0352045 A1 | 11/2020 | Wang et al. |
| 2021/0126666 A1 | 4/2021 | Ng et al. |
| 2022/0166456 A1 | 5/2022 | Danneberg et al. |

OTHER PUBLICATIONS

Apple iPhone 3G Screen Protector, Oct. 25, 2008, retrieved from the Internet: <flicker.com/photos/leypeter/2971332749/in/photostream/>, 1 pg.
Lounge—Review C—iPhone Cases—Speck SkinTight 2-Pack for iPhone, Jul. 6, 2007, retrieved from the Internet: <https://web.archive.org/web/20080305145930/http://www.ilounge.com/index.php/reviews/entry/speck-skintight-2-pack-for-iphone/> [retrieved Jul. 7, 2021], 5 pgs.
IPhonetoughskin.jpg (1200x1200), Jun. 25, 2007, retrieved from the Internet: <https://ww1.prweb.com/prfiles/2007/06/25/535902/iPhonetoughskin.jpg> [retrieved Jul. 7, 2021], 1 pg.
IPhoneskintightpinkandclear.jpg (1200x1200), Jun. 25, 2007, retrieved from the Internet: <https://ww1.prweb.com/prfiles/2007/06/25/535902/iphoneskintightpinkandclear.jpg> [retrieved Jul. 7, 2021], 1pg.
Speck Debuts a Full Line of iPhone Cases Stylishly Smart Speck Cases for the iPhone Now Shipping, Jun. 27, 2007, retrieved from the Internet: <https://www.prweb.com/releases/2007/06/prweb535902.htm> [retrieved Jul. 7, 2021], 4 pgs.
Amazon.com: Speck Products Skin Tight Case 2 Pack for iPhone 1G (Clear,Pink): Artist Not Provided, First Available Jun. 9, 2007, retrieved from the Internet: <https://www.amazon.com/Speck-Products-Tight-iPhone-Clear/dp/B000RQQKQ2> [retrieved Jul. 7, 2021], 4 pgs.
Speck ToughSkin case for iPhone 3G | In-Depth Review | iPodObserver, Oct. 20, 2008, retreived from the Internet: <www.ipodobserver.com/ipo/review/Speck_ToughSkin_case_for_iPhone_3G/> [retrieved Ju. 7, 2021], 12 pgs.
Candyshell Flip, Nov. 7, 2010, retrieved from the Internet: <https://www.youtube.com/watch?v=lbRnkxuCx2c> [retrieved Jun. 2021], 3 pgs.
Gemshell for iPhone 5C, YouTube video, Dec. 23, 2013, retrieved from the Internet: <https://www.youtube.com/watch?v=rEziwb19OX0> [retrieved Jun. 2021], 1 pg.
Danneberg et al., Design U.S. Appl. No. 29/803,068, filed Aug. 10, 2021, entitled "Foldable Case for an Electronic Device".
Danneberg et al., Design U.S. Appl. No. 29/803,077, filed Aug. 10, 2021, entitled "Foldable Case for an Electronic Device".
CandyShell Flip iPhone SE, iPhone 5s & iPhone 5 Cases, retrieved from the Internet: <https://www.speckproducts.com/apple/iphone-cases/iphone-5s-cases/candyshell-flip-iphone-5s-cases/IP5-CS-FLIP.html#> [retrieved Sep. 16, 2020], 3 pgs.
Screen capture from YouTube video clip entitled "Speck CandyShell Flip (iPhone 5):Review," Oct. 17, 2012, retrieved from the Internet: <youtube.com/watch?v=9sZjhNnDoi87>, by user "DetroitBORG". [retrieved Sep. 16, 2020], 2 pgs.
Screen capture from YouTube video clip entitled "Speck CandyShell Flip for the iPhone 4/4s Unboxing & Review" by user "Matt Ringel", Dec. 22, 2011, retrieved from the Internet: <youtube.com/watch?reload=9&V=yValbG_Sggg>, [retrieved Sep. 16, 2020], 1 pg.
Screen capture of Gemshell case from YouTube video clip entitled "Exclusive Review: Speck Cases for iPhone 4 & 4s," by user "TTandE Productions," May 22, 2012, [retrieved from the Internet Oct. 2020], 1 pg.
Extended European Search Report issed in Appln. No. 21210007.7 dated Apr. 21, 2022 (8 pages).

* cited by examiner

OUTER CASE FOR A FOLDABLE MOBILE DEVICE

CROSS-REFERENCE TO RELATED APPLICATION

The present application claims the benefit of the filing dates of each of U.S. Provisional Patent Application No. 63/117,161, filed on Nov. 23, 2020, and U.S. Provisional Patent Application No. 63/231,513, filed on Aug. 10, 2021, the disclosures of all of which are hereby incorporated herein by reference.

FIELD OF THE INVENTION

The present application relates generally to mobile device cases, and in particular, cases for protecting foldable mobile devices.

BACKGROUND OF THE INVENTION

Cases for mobile electronic devices, such as mobile phones, tablets, and mobile computers, e.g., laptop computers, have been designed to provide at least some protection from impact events, such as when the device is dropped, hit, or otherwise struck. The vast majority of such cases have been designed for smartphones or tablets that retain their form factor at all times due to the relatively significant investment that consumers make in purchasing such devices as well as to the relatively higher exposure to impacts and potential damage inherent in the design of such devices.

Recently, however, mobile electronic devices such as the SAMSUNG GALAXY FOLD® and SAMSUNG GALAXY Z FLIP® smartphones by Samsung Electronics Co., Ltd., the RAZR® smartphone by Motorola Mobility LLC (a wholly owned subsidiary of Lenovo), and the SURFACE DUO™ by Microsoft Corporation having foldable display screens or multiple display screens that pivot relative to each other have been introduced. Such devices have the same inherent risks as their constant form factor counterparts, and thus developments have been made to create mobile device cases such as the GALAXY FOLD and GALAXY Z SYMMETRY SERIES® FLEX cases by Otter Products, LLC. Such cases utilize two separate pieces to cover opposing portions of the smartphones and thus require the user to keep the pieces together when not in use.

Cases with hinged connections for foldable phones have been considered, such as those in U.S. Pat. No. 10,064,298, the entirety of the disclosure of which being hereby incorporated herein by reference. The protective enclosures described in the aforementioned patent include bellows and elongated, resilient hinge elements that are arranged to cover all or a portion of a hinge of a mobile device inserted into such enclosures. Such placements of the hinge elements of the protective enclosures prevent insertion of a mobile device when the enclosures are in closed positions. Moreover, such placements require either stretching of the hinge elements that can lead to cyclic fatigue of those elements or, as in the example of bellows, require additional material to create the accordion-like structure of the bellows.

Accordingly, still further improvements in foldable mobile device cases to enhance their utility and reduce material costs and waste are desirable.

SUMMARY OF THE INVENTION

In accordance with one aspect, a foldable case may be configured for removably receiving a separate and distinct mobile electronic device that may have a front device surface, a rear device surface opposite the front device surface, and a periphery extending between the front device surface and the rear device surface of the device. The case may include first and second cover members and opposing hinge members. The first and the second cover members may include respective first and second rear walls, respective first and second peripheral rims, and respective first and second sidewalls extending between the respective rear walls and the respective peripheral rims. In this manner, the first and the second cover members may define respective first and second recesses configured for receiving respective first and second portions of the device. Each of the opposing hinge members may extend between adjacent locations at the respective peripheral rims of the first and the second cover members to hingedly connect the first and the second cover members.

In some arrangements, the device may be foldable. In some arrangements, the device may include circuitry and a foldable display screen covering the circuitry. In some other arrangements, the device may include circuitry and a plurality of display screens, e.g., two display screens, that may be foldable relative to each other and in which each of the screens may cover the circuitry. In some arrangements, each of the first and the second cover members may cover a section of the foldable case in both a closed position of the case in which the first and the second peripheral rims confront each other and an open position of the case in which the first and the second peripheral rims face in the same direction.

In some arrangements, the first and the second cover members may be rotatable relative to each other to a closed position of the case in which the first and the second peripheral rims confront each other and to an open position of the case in which the first and the second peripheral rims face in the same direction. In some such arrangements, the first rear wall and the first sidewall together may form a first end surface of the first cover member and the second rear wall and the second sidewall together may form a second end surface of the second cover member. In some such arrangements, the first and the second end surfaces of the cover members and the opposing first and second hinge members together may define opposing side openings when the case is in the open position. In some such arrangements, each of the side openings may include a first aperture spaced from a respective one of the hinge members and a second aperture bounded by the respective one of the hinge members and extending from the respective one of the first apertures. In some such arrangements, the second aperture may be wider along a portion of the second aperture than the respective one of the first apertures.

In some arrangements, the first and the second peripheral rims may be in abutment when the foldable case is in the closed position. In some arrangements, the first and the second peripheral rims may lie in the same plane.

In some arrangements, the first and the second end surfaces may define a channel that may extend between the first and the second cover members when the case is in the open position. In some arrangements, the end surfaces of both of the first and the second cover members together with both of the opposing hinge members may define an end opening configured for receiving the device through the end opening when the case is in the closed position. In some such arrangements, the end opening may be configured for either one or both of inserting and removing the device through the end opening.

In some arrangements, the side openings may form ends of the channel.

In some arrangements, the first rear wall of the first cover member may include a lens opening that may be configured for alignment with and exposure of one or more camera lenses of the device. In some arrangements, the second rear wall of the second cover member may include a connector opening that may be configured for alignment with and exposure of an electrical power connector of the device.

In some arrangements, the mobile electronic device may include a first device member hingedly attached to a second device member such that the front and the rear device surfaces are formed by a combination of the first and the second device members. In some such arrangements, either one or both of i) the first rear wall may be configured such that a majority of the rear device surface of the mobile electronic device formed by the first device member is exposed by the first rear wall and ii) the second rear wall may be configured such that a majority of the rear device surface of the mobile electronic device formed by the second device member is exposed by the second rear wall.

In some arrangements, the foldable case may be foldable about a widthwise folding axis. In some other arrangements, the foldable case may be foldable about a lengthwise folding axis. In still other arrangements, the foldable case may be foldable about both widthwise and lengthwise folding axes.

In accordance with another aspect, a foldable case may be configured for removably receiving a separate and distinct mobile electronic device that may have a front device surface, a rear device surface opposite the front device surface, and a periphery extending between the front device surface and the rear device surface of the device. The case may include first and second shells, first and second cover portions, and opposing first and second hinge members. The first and the second shells may include respective first and second shell rear walls and respective first and second shell sidewalls extending from the respective shell rear walls. The first and the second cover portions may be flexible and may include respective first and second cover rear walls and respective first and second cover sidewalls extending from the respective cover rear walls. The first and the second shells may be combined with the first and the second cover portions, respectively, to form respective first and second cover members. The first and the second cover members may define respective first and second recesses that may be configured for receiving respective first and second portions of the device. The first hinge member of the opposing hinge members may extend between first and second adjacent locations of the first and the second cover members and the second hinge member of the opposing hinge members may extend between third and fourth adjacent locations of the first and the second cover members to hingedly connect the first and the second cover members. In this manner, a combination of the first and the second cover members and the opposing hinge members collectively may form an outer rim of the case. Each of the first, the second, the third, and the fourth locations may be on the outer rim of the case.

In some arrangements, the outer rim may define a bezel of the case.

In some arrangements, the first and the second shells may be made of polycarbonate (PC), and the first and the second cover portions may be made of a thermoplastic elastomer (TPE), which may be thermoplastic polyurethane (TPU). Other materials also may be used as set forth further herein.

In some arrangements, the first shell may be integral with the first cover portion to form the first cover member, the second shell may be integral with the second cover portion to form the second cover member, and each of the first and the second hinge members may be integral with the first and the second cover members to form a one-piece structure.

In some arrangements, each of the first and the second hinge members may be directly attached to the first and the second cover portions. In some other arrangements, each of the first and the second hinge members may be directly attached to the first and the second shells.

In some arrangements, the first and the second shells may be rigid.

In some arrangements, at least majorities of each of the first and the second cover portions may lie within respective first and second pockets formed by the first and the second shells, respectively.

In some arrangements, the first and the second cover portions may form respective first and second rear wall openings. The first and the second rear wall openings may expose respective first and second inner surfaces of the first and the second shell rear walls, respectively.

In some arrangements, at least majorities of each of the first and the second shells may lie within respective first and second pockets formed by the first and the second cover portions, respectively.

In some arrangements, each of the first and the second shell sidewalls may extend to respective first and second shell peripheral rims, and each of the first and the second cover sidewalls may extend to respective first and second cover peripheral rims that extend beyond and overlie the first and the second shell peripheral rims, respectively. In some other arrangements, each of the first and the second cover sidewalls may extend to respective ones of the first and the second cover peripheral rims, and each of the first and the second shell sidewalls may extend to respective ones of the first and the second shell peripheral rims that extend beyond and overlie the first and the second cover peripheral rims, respectively.

In some arrangements, opposing corners of each of the first and the second shells may include cutouts, and respective flange portions of the first and the second cover portions may extend through the cutouts.

In some arrangements, the first shell rear wall, the first cover rear wall, the first shell sidewall, and the first cover sidewall together may form a first end surface of the first cover member, and the second shell rear wall, the second cover rear wall, the second shell sidewall, and the second cover sidewall together may form a second end surface of the second cover member. In some such arrangements, the first cover portion may extend along an entirety of the length of the first end surface, and the second cover portion may extend along an entirety of the length of the second end surface.

In some arrangements, the first and the second cover members may be rotatable relative to each other to a closed position of the case in which a first section of the outer rim formed by the first cover member may confront a second section of the outer rim formed by the second cover member and to an open position of the case in which the first section of the outer rim and the second section of the outer rim may face in the same direction. In some such arrangements, the first shell rear wall, the first cover rear wall, the first shell sidewall, and the first cover sidewall together may form a first end surface of the first cover member, and the second shell rear wall, the second cover rear wall, the second shell sidewall, and the second cover sidewall together may form a second end surface of the second cover member. In some such arrangements, the first and the second end surfaces and the opposing first and second hinge members together may define a channel when the case in the open position.

In some arrangements, the first and the second cover members may be rotatable relative to each other to a closed position of the case in which a first section of the outer rim formed by the first cover member may confront a second section of the outer rim formed by the second cover member and to an open position of the case in which the first section of the outer rim and the second section of the outer rim may face in the same direction. In some such arrangements, the first shell rear wall, the first cover rear wall, the first shell sidewall, and the first cover sidewall together may form a first end surface of the first cover member, and the second shell rear wall, the second cover rear wall, the second shell sidewall, and the second cover sidewall together may form a second end surface of the second cover member. In some such arrangements, the first and the second end surfaces of the cover members and the opposing first and second hinge members together may define opposing side openings when the case is in the open position. In some such arrangements, each of the side openings may include a first aperture spaced from a respective one of the hinge members and a second aperture bounded by the respective one of the hinge members and extending from the respective one of the first apertures. In some such arrangements, the second aperture may be wider along a portion of the second aperture than the respective one of the first apertures.

In some arrangements, the mobile electronic device may include a first device member hingedly attached to a second device member such that the front and the rear device surfaces are formed by a combination of the first and the second device members. In some such arrangements, either one or both of i) the first shell rear wall may be configured such that a majority of the rear device surface of the mobile electronic device formed by the first device member is exposed by the first shell rear wall and ii) the second shell rear wall may be configured such that a majority of the rear device surface of the mobile electronic device formed by the second device member is exposed by the second shell rear wall.

In some arrangements, the foldable case may be foldable about a widthwise folding axis. In some other arrangements, the foldable case may be foldable about a lengthwise folding axis. In still other arrangements, the foldable case may be foldable about both widthwise and lengthwise folding axes.

In accordance with another aspect, a foldable case may be configured for removably receiving a separate and distinct mobile electronic device having a front device surface, a rear device surface opposite the front device surface, and a periphery extending between the front device surface and the rear device surface of the device. The case may include a first and second outer shells and an inner shell. The first and the second outer shells may be rigid and may include respective first and second outer rear walls, respective first and second outer peripheral rims, and respective first and second outer sidewalls extending between the respective outer rear walls and the respective outer peripheral rims. The inner shell may include a pair of struts. The inner shell may include first and second inner shell portions that each may be flexible and that each may be integrally connected to each of the pair of struts to form a one-piece structure. The first and the second inner shell portions may include respective first and second inner rear walls, respective first and second inner peripheral rims, and respective first and second inner sidewalls extending between the respective inner rear walls and the respective inner peripheral rims to form respective first and second recesses that each may be configured for receiving respective first and second portions of the device. The first and the second inner peripheral rims may extend beyond and overlie the first and the second outer peripheral rims, respectively. The first and the second inner shell portions may be integral with and may cover the first and the second outer shells, respectively, to form first and second cover members. Each of the struts may be flexible such that the first and the second cover members may be hingedly connected.

In some arrangements, the pair of struts and the first and the second inner shell portions may be integral such that they are inseparable without fracture of any one or any combination of the struts and the inner shell portions.

In some arrangements, the inner peripheral rims may be integral with and aligned with each of the struts to define an outer rim of the case.

In some arrangements, the inner shell may be co-molded onto the first and the second outer shells.

In some arrangements, the mobile electronic device may include a first device member hingedly attached to a second device member such that the front and the rear device surfaces are formed by a combination of the first and the second device members. In some such arrangements, either one or both of i) the first outer rear wall may be configured such that a majority of the rear device surface of the mobile electronic device formed by the first device member is exposed by the first outer rear wall and ii) the second outer rear wall may be configured such that a majority of the rear device surface of the mobile electronic device formed by the second device member is exposed by the second outer rear wall.

In some arrangements, the foldable case may be foldable about a widthwise folding axis. In some other arrangements, the foldable case may be foldable about a lengthwise folding axis. In still other arrangements, the foldable case may be foldable about both widthwise and lengthwise folding axes.

BRIEF DESCRIPTION OF THE DRAWINGS

A more complete appreciation of the subject matter of the present invention and various advantages thereof may be realized by reference to the following detailed description and the accompanying drawings, in which.

DETAILED DESCRIPTION

Figures 1A, 1B:
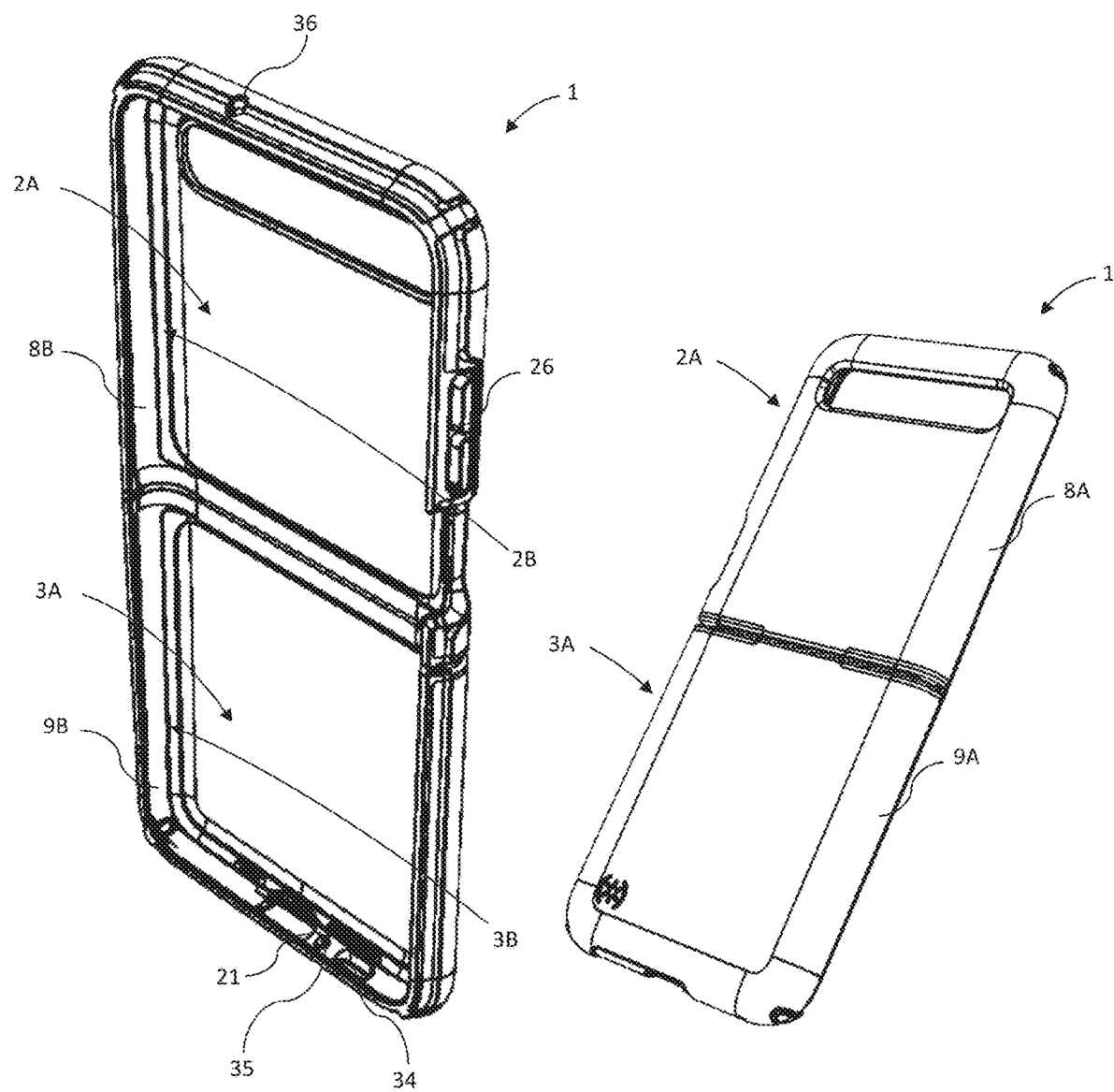
FIGS. 1A and 1B are front and rear perspective views, respectively, of a foldable mobile device case, shown in an open position in accordance with an embodiment.

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

As used herein, "mobile device" refers to a mobile phone device, an electronic tablet device, a laptop computer, or other mobile computing system and like.

Referring now to the example of FIGS. 1A-6, foldable case 1 is configured for removably receiving a separate and distinct mobile device. In some arrangements, the mobile device includes a front device surface, a rear device surface opposite the front device surface, and sides extending between the front device surface and the rear device surface and forming a periphery of the device. The foldable case includes a first cover member and a second cover member attached to the first cover member by opposing hinge members 10A, 10B. The first cover member includes rigid first outer shell 2A and flexible first inner shell portion 2B received within a first pocket defined by the rigid outer shell. The second cover member similarly includes rigid second outer shell 3A and flexible inner shell portion 3B received within a second pocket defined by the rigid second outer shell. As illustrated by contrasting FIGS. 1A-4B with FIGS. 5 and 6, the first cover member and the second cover member are rotatable about a folding axis, in the example shown a widthwise folding axis, defined by hinge members 10A, 10B by way of the flexibility of the hinge members.

First outer shell 2A includes first outer rear wall 4A, first outer peripheral rim 6B, first outer sidewall 8A extending between the first outer rear wall and the first outer peripheral rim. In the example shown, first outer shell 2A further includes instrument cluster opening 20, which may be a lens or other sensor device opening, configured for alignment with and exposure of one or more instruments of the mobile device, such as but not limited to one or more camera lenses, one or more camera flashes or other illumination elements, one or more rear-facing microphones, and one or more Light Detection and Ranging (LIDAR) or other navigational or environmental detection sensors. Second outer shell 3A is separate from first outer shell 2A and includes second outer rear wall 5A, second outer peripheral rim 7B, second outer sidewall 9A extending between the second outer rear wall and the second outer peripheral rim.

First inner shell portion 2B includes first inner rear wall 4B, first inner peripheral rim 6A, and first inner sidewall 8B extending between the first inner rear wall and the first inner peripheral rim to form a first recess configured for receiving and retaining one part, e.g., a display screen side, of a mobile device. Second inner shell portion 3B includes second inner rear wall 5B, second inner peripheral rim 7A, and second inner sidewall 9B extending between the second inner rear wall and the second inner peripheral rim to form a second recess configured for receiving and retaining another part, e.g., a further display screen side or a keyboard or other entry button side, of a mobile device. As shown, first and second inner peripheral rims 6A, 7A extend beyond and overlie first and second outer peripheral rims 6B, 7B, respectively. In the example shown, first and second inner shell portions 2B, 3B are integral with and cover portions of first and second outer shells 2A, 3A, respectively, to form the first and the second cover members, although in other arrangements, the first and the second inner shell portions may be removable from the respective outer shells. As further shown in this example, first and second inner rear walls 4B, 5B may include respective rear wall openings 22A, 22B that expose respective first and second inner surfaces of first and second outer rear walls 4A, 5A, respectively. Although rear wall openings 22A, 22B may be excluded such that the first and second inner rear walls 4B, 5B completely or at least substantially cover first and second outer rear walls 4A, 5A, respectively, use of the rear wall openings avoids having the first and second inner rear walls from obscuring a view to an inserted mobile device when transparent or translucent outer rear walls are employed. Use of rear wall openings 22A, 22B also may provide an air gap between portions of an inserted mobile device and foldable case 1 to provide additional impact protection to the mobile device.

In the example shown, first inner shell portion 2B is indirectly attached to the second inner shell portion 3B via flexible struts 10A, 10B acting as opposing hinge members. As in this example, first and second inner shell portions 2B, 3B and opposing hinge members 10A, 10B may be integral with each other to form a single inner shell 25. In such arrangements, first and second inner shell portions 2B, 3B and opposing hinge members 10A, 10B are inseparable without fracture of any one or any combination of the inner shell portions and the hinge members. A top portion of inner shell 25 defined by a combination of first and second inner peripheral rims 6A, 7A and hinge members 10A, 10B directly attached to the inner peripheral rims forms a flexible outer rim that provides impact protection as well as a frictional surface to prevent accidental sliding of foldable case 1 and an inserted mobile device.

Figure 3A:
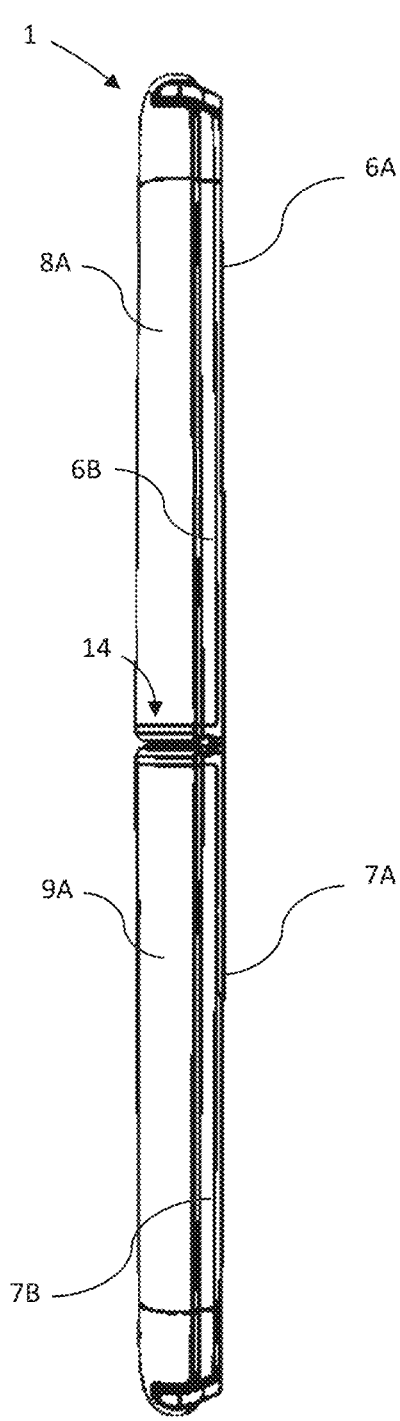
FIGS. 3A and 3B are left side and right side views, respectively, of the foldable mobile device case in the open position of FIGS. 1A and 1B.
Figure 3B:
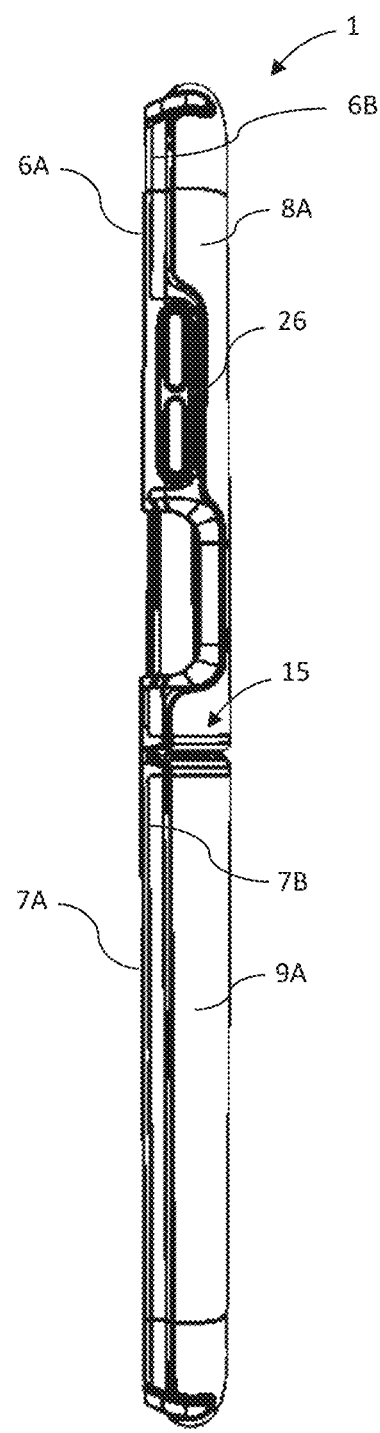
Figure 4A:
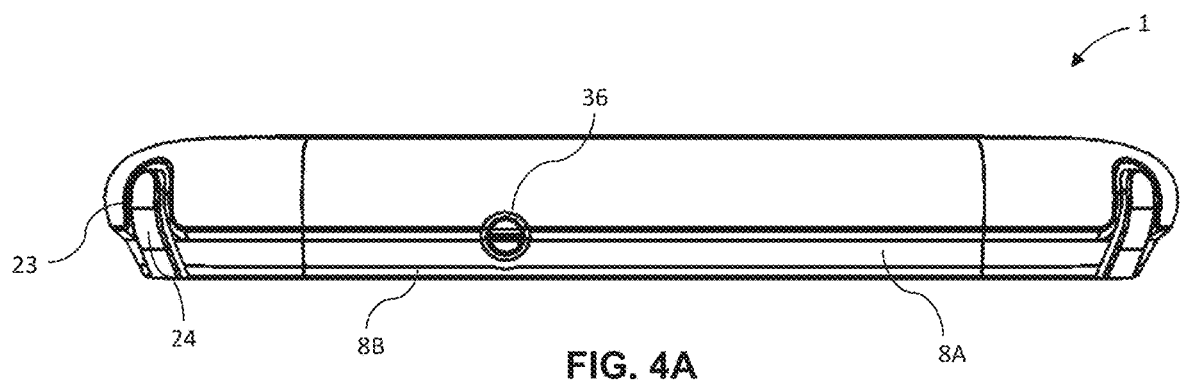
FIGS. 4A and 4B are top and bottom views, respectively, of the foldable mobile device case in the open position of FIGS. 1A and 1B.
Figure 4B:
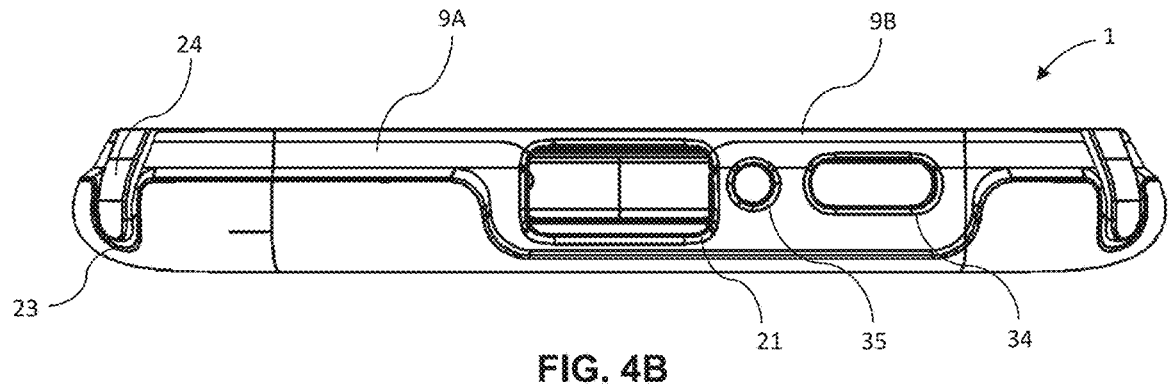
Figure 6:
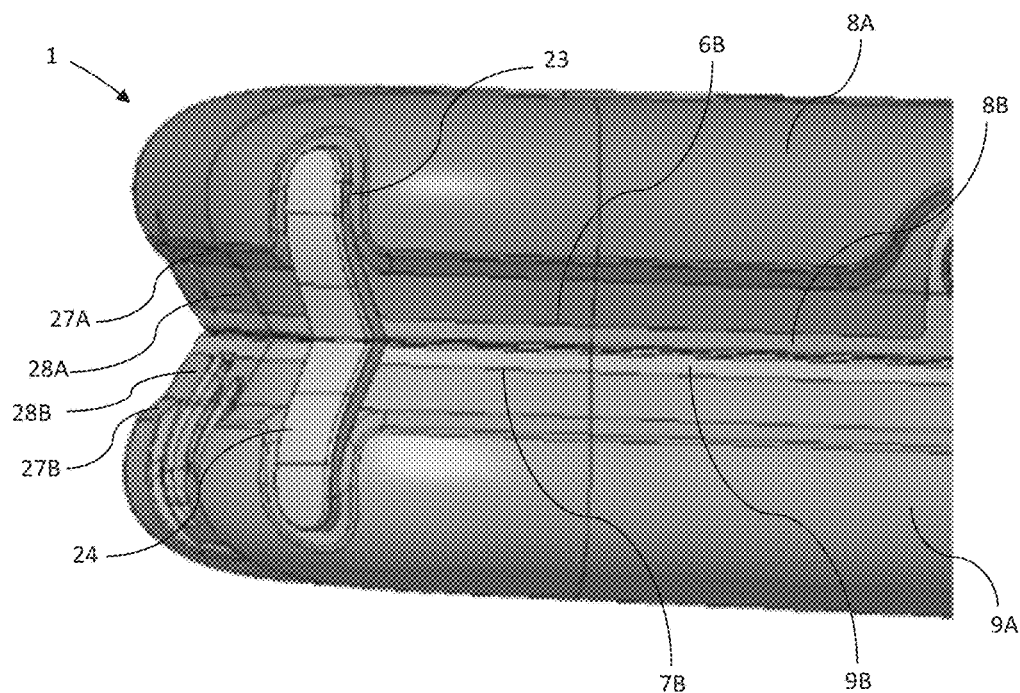
FIG. 6 is a left side perspective view of the foldable mobile device case of FIGS. 1A and 1B shown in the closed position.

As best shown in FIGS. 1A and 3B, first inner shell portion 2B of inner shell 25 is contoured to form button cover 26 configured for covering a toggle switch, e.g. for volume control of a mobile device. In other arrangements, additional or different button covers may be employed, such as one configured for covering a power button of a mobile device. As shown in FIGS. 1A and 4B, second inner shell portion 3B in combination with second outer shell 3A forms connector opening 21 configured for alignment with and exposure of an electrical power connector of the device. First and second outer shells 2A, 3A and first and second inner shell portions 2B, 3B are configured with additional ports and openings 34-36, as shown, adapted for receipt of auxiliary devices or other hardware, e.g., jacks for headphone connections. As best shown in FIGS. 4B and 6, opposing corners of each of first and second outer shells 2A, 3A include cutouts 23 and opposing corners of each of first and second inner shell portions 2B, 3B include flange portions 24 that extend through respective ones of the cutouts in the manner shown and described in U.S. Pat. No. 8,755,852, the entirety of the disclosure of which is hereby incorporated by reference herein.

Figure 2A:
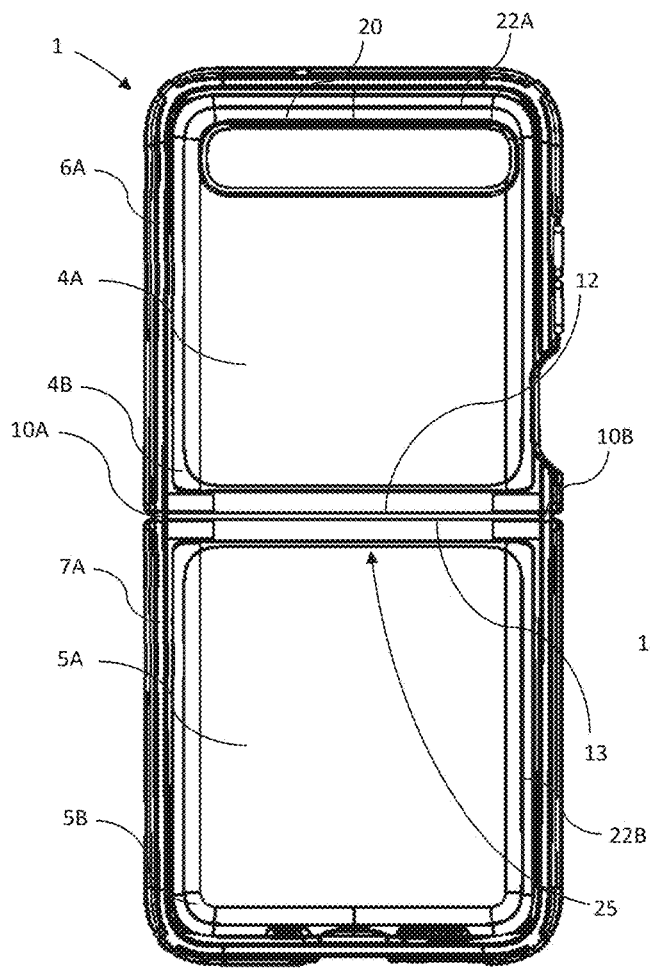
FIGS. 2A and 2B are front and rear views, respectively, of the foldable mobile device case in the open position of FIGS. 1A and 1B.
Figure 2B:
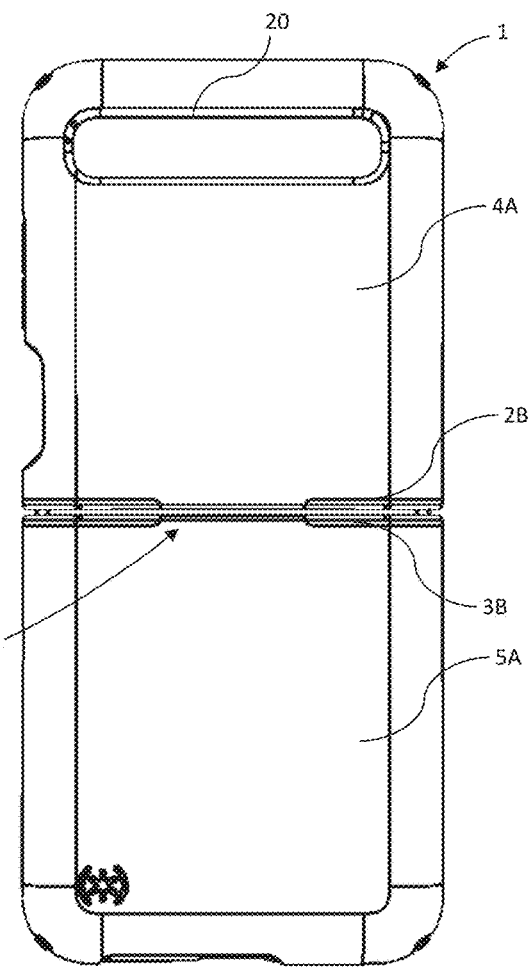
Figure 3C:
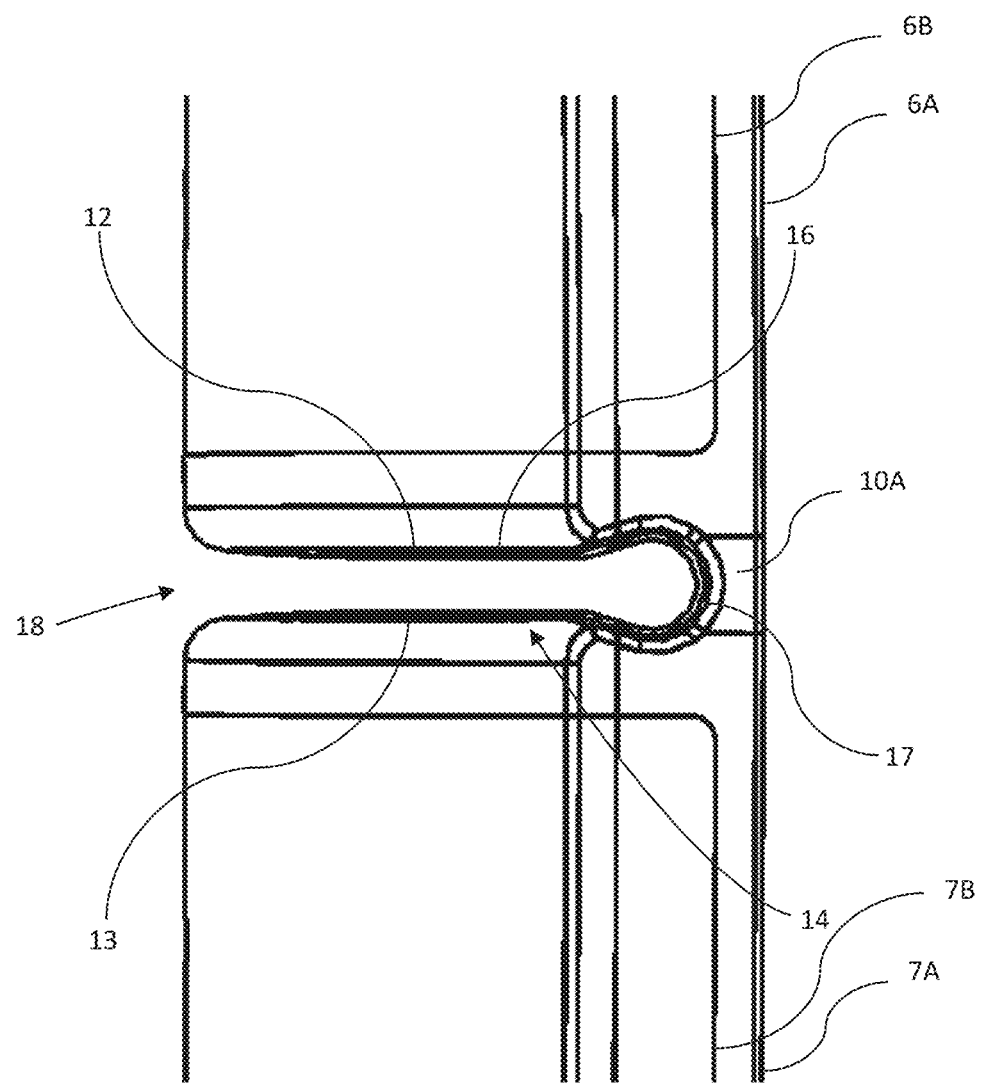
FIG. 3C is an expanded right side view of a section of the foldable mobile device case in the open position of FIGS. 1A and 1B.

As best shown in FIGS. 2B and 3C, first outer rear wall 4A, first inner rear wall 4B, first outer sidewall 8A, and first inner sidewall 8B together form first end surface 12 of the first cover member and second outer rear wall 5A, second inner rear wall 5B, second outer sidewall 9A, and second inner sidewall 9B together form second end surface 13 of the second cover member. First and second end surfaces 12, 13 define channel 18 extending between the first and the second cover members when the case is in the open position. Spacing between first end surface 12 and second end surface 13 defining channel 18 allows the first and second cover members to be opened relative to each other beyond a 180 degree angle defined by planes passing through and defined by the first and second cover members and thereby allows for easier removal of an inserted mobile device from foldable case 1.

With reference to FIGS. 3A-3C, first and second end surfaces 12, 13 of the cover members and opposing first and second hinge members 10A, 10B together define opposing side openings 14, 15 when the case is in the open position. Each of side openings 14, 15 include first aperture 16 spaced from its corresponding one of hinge members 10A, 10B and second aperture 17 adjacent to and bounded by its corresponding one of the hinge members in which each of the first apertures intersects its corresponding second aperture. As best shown in FIG. 3C, a portion of second aperture 17 in some arrangements may be wider than the entirety of first aperture 16 along a length of the second aperture. Moreover, as further shown in this example, in some arrangements, second aperture 17 may have a partially circular profile which may reduce residual stresses in first and second hinge members 10A, 10B to delay structural failure due to cyclic fatigue, especially that due to rotation of the first and second cover members relative to each other.

Figure 5:
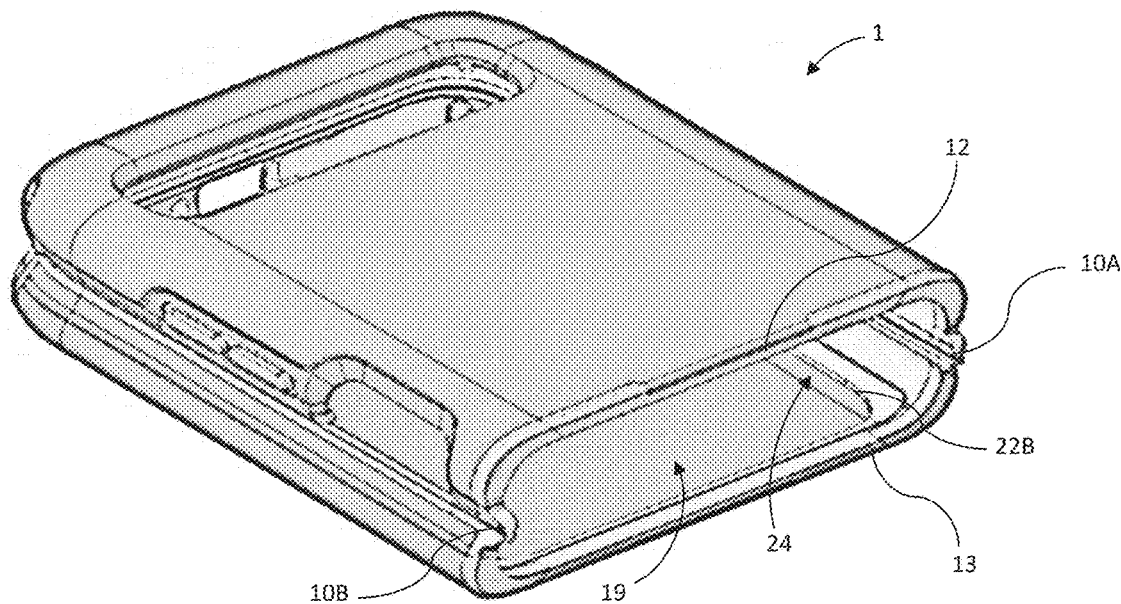
FIG. 5 is a rear perspective view of the foldable mobile device case of FIGS. 1A and 1B, shown in a closed position in accordance with an embodiment.

Referring now to FIG. 5, hinge members 10A, 10B are elastic such that they fold over themselves about the widthwise folding axis to provide a closed position of foldable case 1 in which inner peripheral rims 6A, 7A of the respective first and second cover members are in abutment. A combination of end surfaces 12, 13 and opposing hinge members 10A, 10B forms end opening 19 allowing a mobile device to be inserted into foldable case 1. Once a mobile device is inserted, hinge members 10A, 10B prevent one cover member from sliding off of the corresponding portion of the mobile device on which that cover member is placed without the other cover member also being slid off of the corresponding portion of the mobile device on which that other cover member is placed. Each of first and second inner sidewalls 8B, 9B of first and second inner shell portions 2B, 3B have opposing side portions that may be spaced apart a predetermined distance such that a mobile device inserted into foldable case 1 fits tightly between such opposing side portions. One or both of first and second inner shell portions 2B, 3B may be made of a material such that a contact surface of the one or both of the first and second inner shell portions provides sufficient friction to inhibit or prevent sliding of the inserted mobile device relative to the one or both of the first and second inner shell portions. Accordingly, in such manners, the first and second cover members and opposing hinge member 10A, 10B together retain and secure a mobile device inserted into the cover members in both open and closed positions.

As shown in FIG. 6, first outer sidewall 8A of first outer shell 2A and second outer sidewall 9A of second outer shell 3A include respective first tapered surfaces 27A, 27B and second tapered surfaces 28A, 28B extending from the respective first tapered surfaces to respective outer peripheral rims 6B, 7B. Such tapered surfaces allow for fingers of users or other objects to fit between the first and the second cover members when the foldable case 1 is in the closed position and thereby allow for ease of opening of the foldable case.

Figure 7:
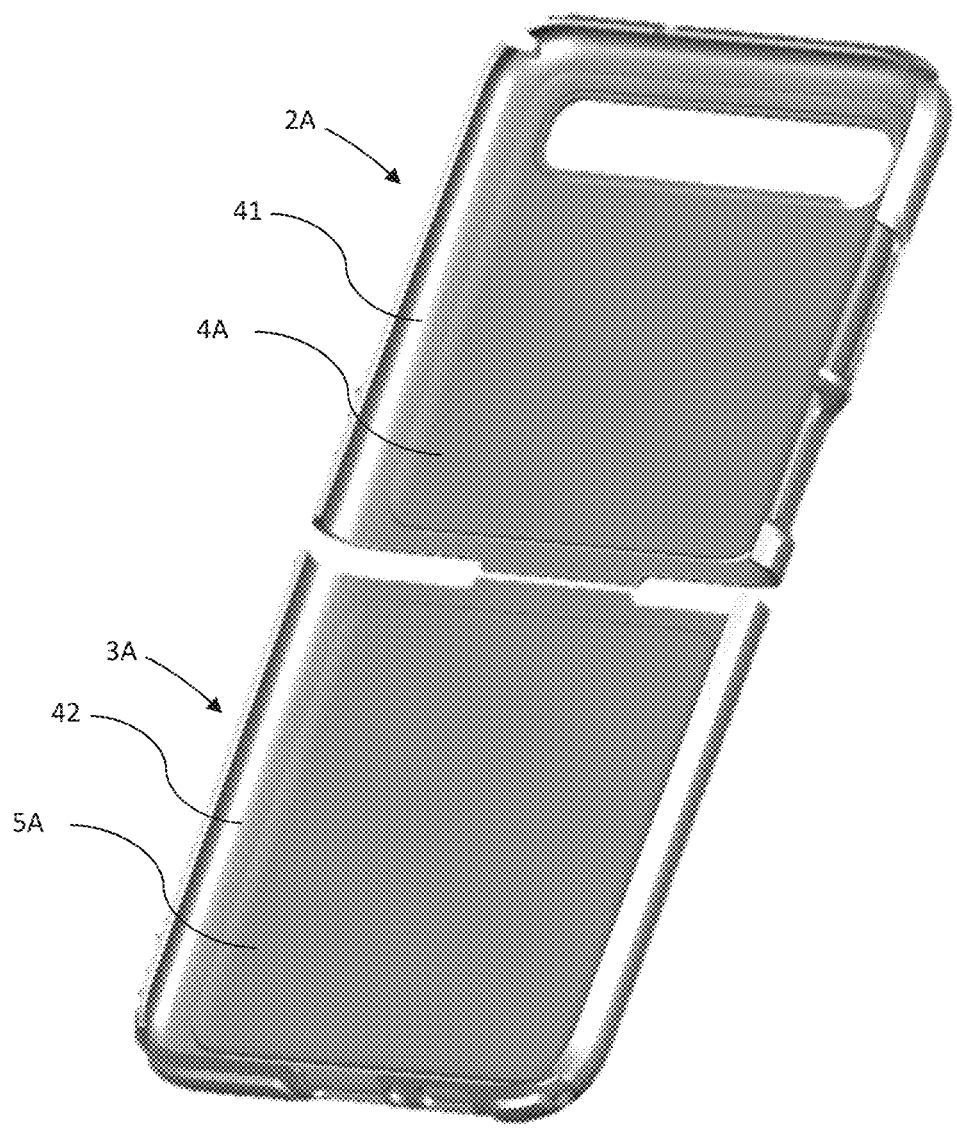
FIG. 7 is a front perspective view of outer shells of the foldable mobile device case of FIG. 1 in accordance with an embodiment.
Figure 8A:
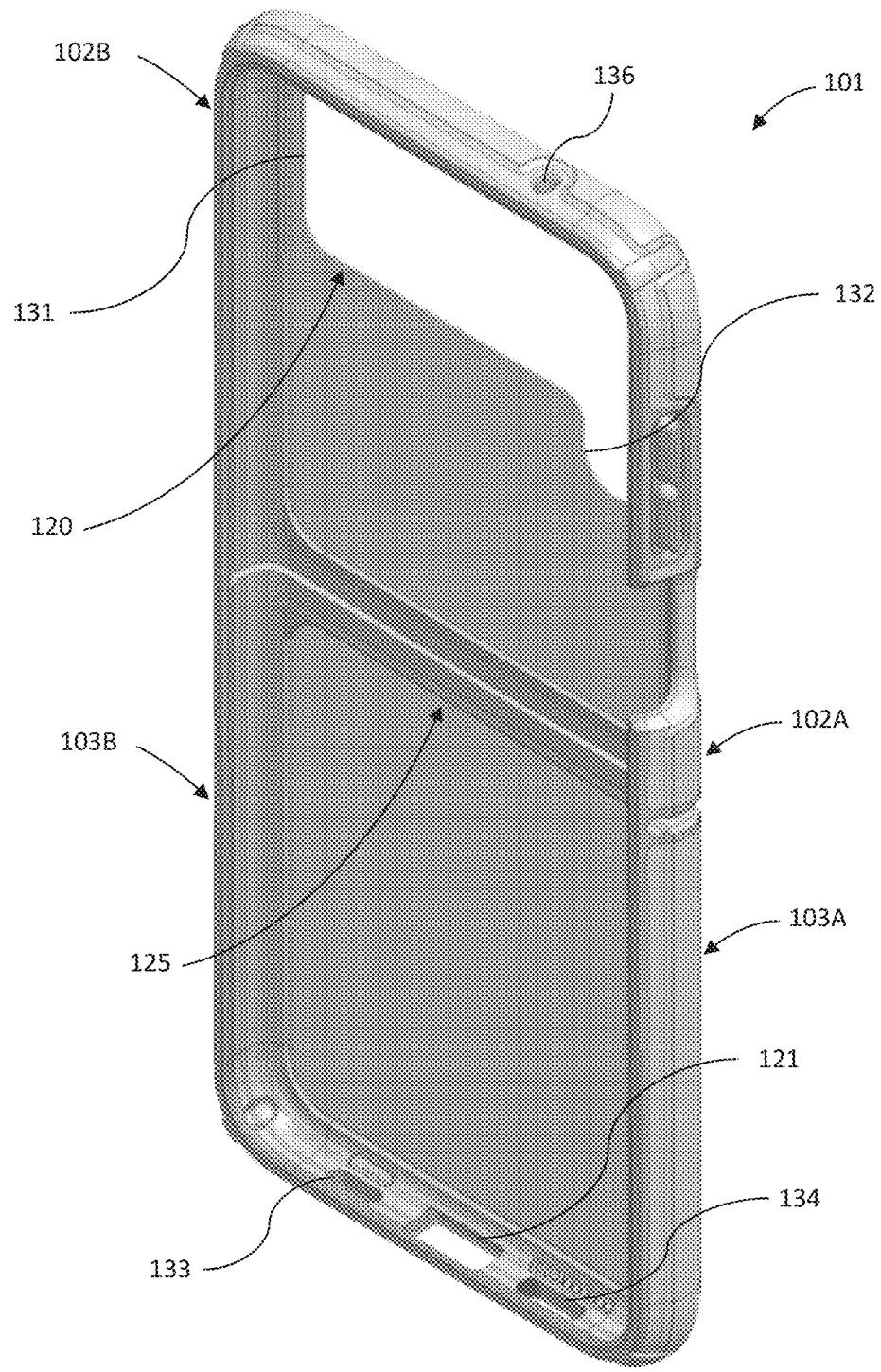
FIG. 8A is a front perspective view of a foldable mobile device case, shown in an open position in accordance with an embodiment.
Figure 8B:
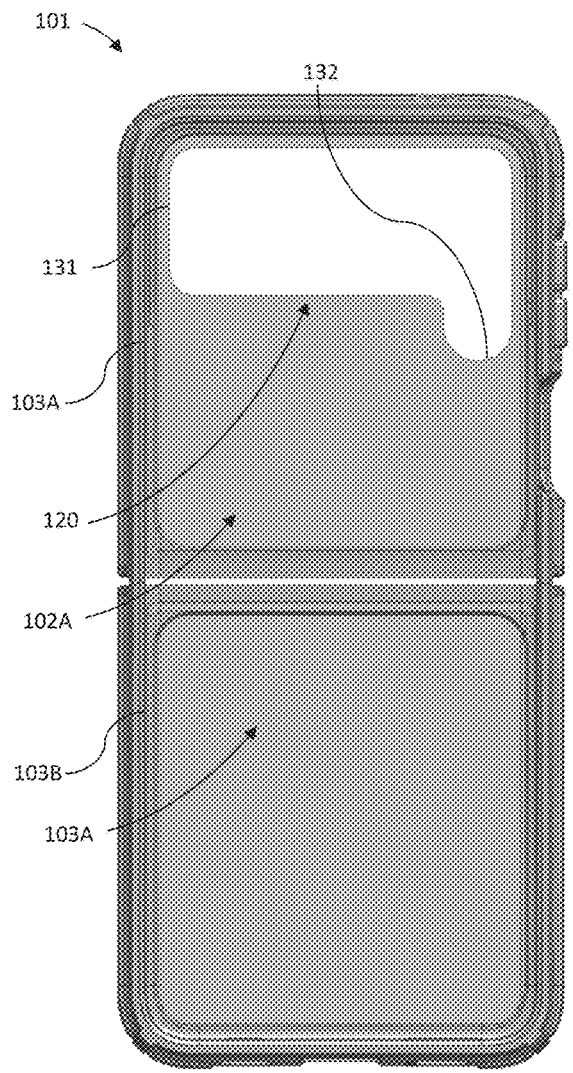
FIGS. 8B and 8C are front and rear views, respectively, of the foldable mobile device case in the open position of FIG. 8A.
Figure 8C:
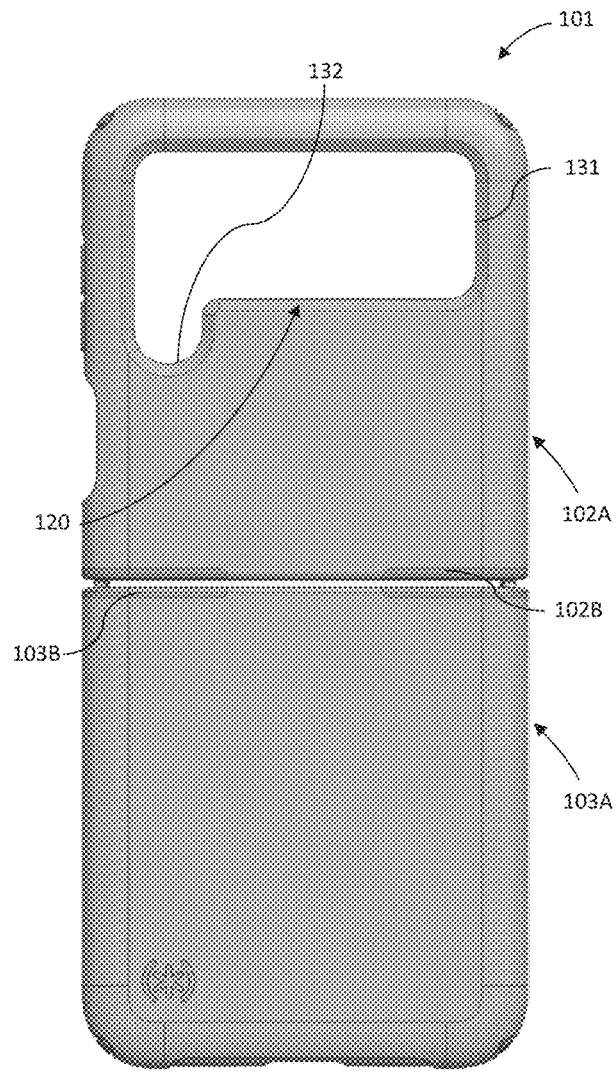
Figure 8D:
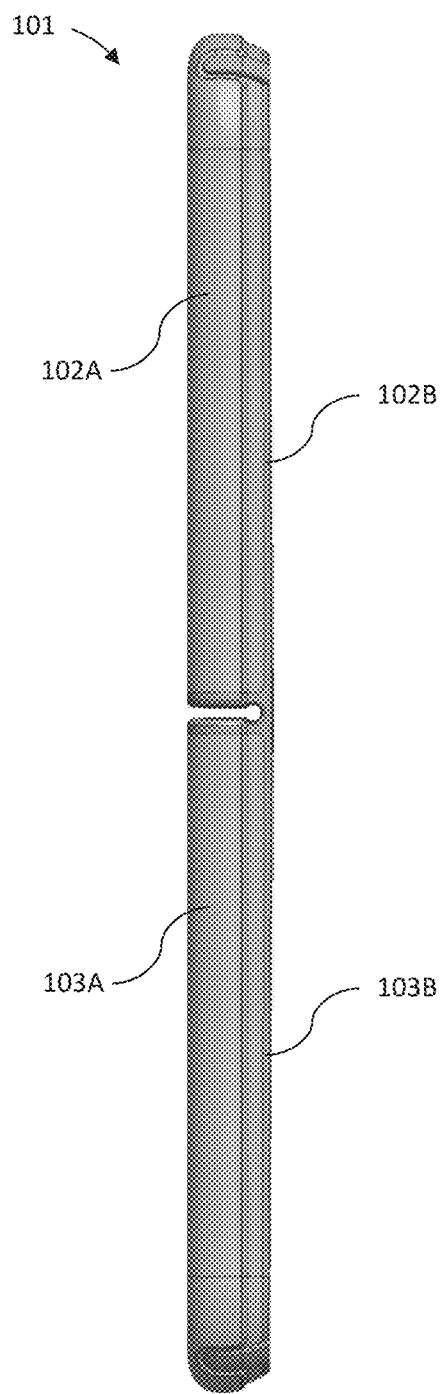
FIGS. 8D and 8E are left side and right side views, respectively, of the foldable mobile device case in the open position of FIG. 8A.
Figure 8E:
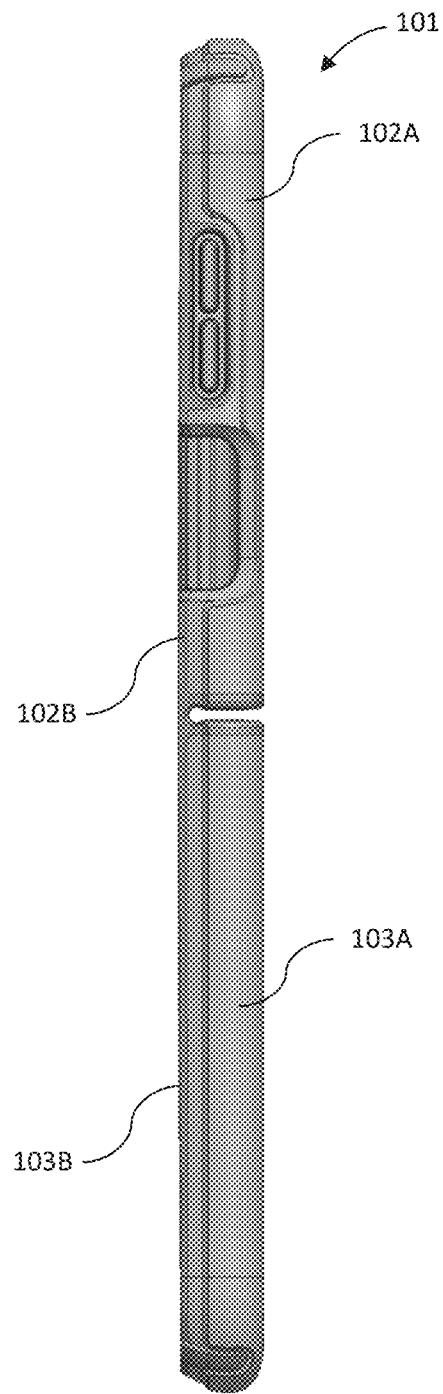
Figure 8F:
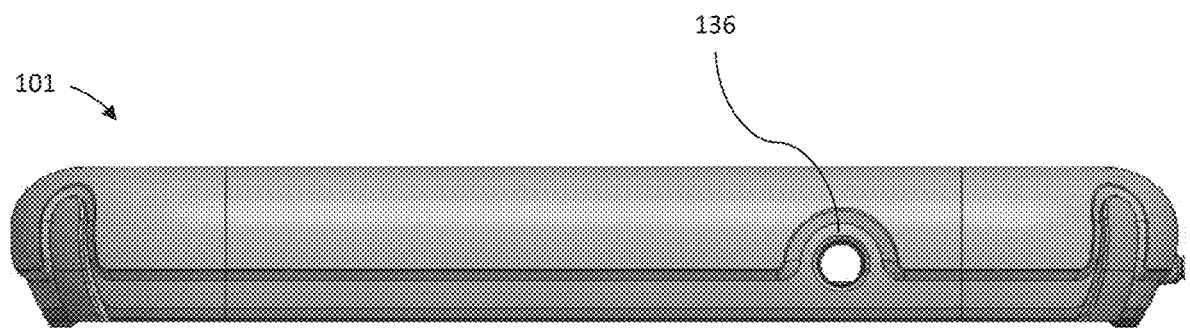
FIGS. 8F and 8G are top and bottom views, respectively, of the foldable mobile device case in the open position of FIG. 8A.
Figure 8G:
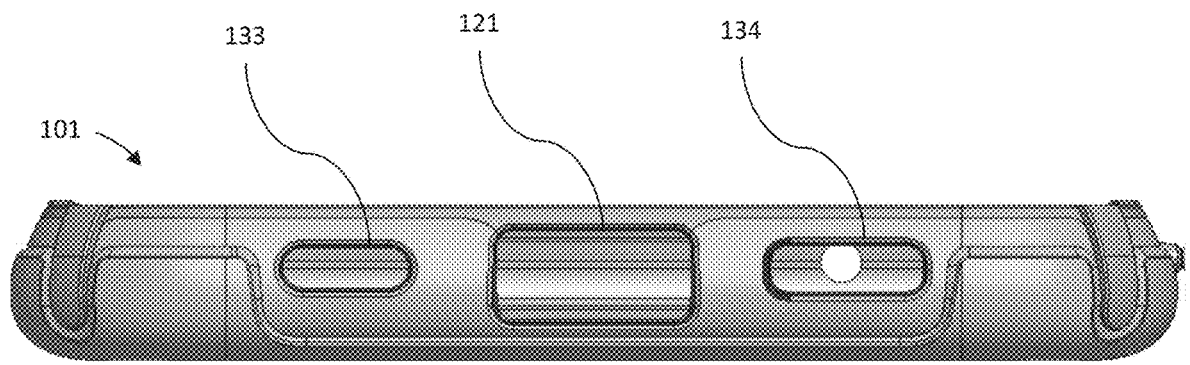

Referring now to FIG. 7, each of first and second outer shells 2A, 2B include respective recesses 41, 42 around respective perimeters of the first and the second outer shells. Recesses 41, 42 lie below the respective inner surfaces of outer rear walls 4A, 5A in order to allow respective first and second inner shell portions 2B, 3B of inner shell 25 to be formed within the recesses, e.g. by co-molding the first and the second inner shell portions into the recesses. During the molding process, steps created between recesses 41, 42 and the inner surfaces of outer rear walls 4A, 5A may act as shutoffs for the molding tool to minimize flash on first and second inner shell portions 2B, 3B. The use of recesses 41, 42 further allows first and second inner shell portions 2B, 3B to be thicker and thereby provide greater impact absorption than a thickness such inner shell portions could be without recesses 41, 42.

Referring now to FIGS. 8A-8G, foldable case 101 is substantially similar to foldable case 1 with the exception that foldable case 101 includes instrument cluster opening 120 in place of instrument cluster opening 20 and configured for alignment with and exposure of one or more instruments of the mobile device, connector opening 121 defined by a combination of second inner shell portion 103B of inner shell 125 and second outer shell 103A in place of connector opening 21, and additional ports and openings 134-136 defined by a combination of first inner shell portion 102B of inner shell 125 and first outer shell 102A in place of additional ports and openings 34-36. Instrument cluster opening 120 includes rectangular portion 131 and partially oval portion 132, which as shown may have a semi-circular shape, although the shape of the opening may vary depending on the instruments to be aligned with and exposed by the instrument cluster opening which, as with instrument cluster opening 20, may be but are not limited to being one or more camera lenses, one or more camera flashes or other illumination elements, one or more rear-facing microphones, and one or more LIDAR or other navigational or environmental detection sensors. As in the example shown, instrument cluster opening 120 may be entirely defined by first outer shell 102A.

Referring now to FIGS. 9A-9G, foldable case 201 is substantially similar to foldable case 1 with the exception that foldable case 201 includes second outer shell 203A lacking at least a majority of a rear wall like that of rear wall 5A of second outer shell 3A, opposing hinge members 510A, 510B in place of hinge members 10A, 10B, instrument cluster opening 220 in place of instrument cluster opening 20, connector opening 221 defined by a combination of first inner shell portion 202B of inner shell 225 and first outer shell 202A in place of connector opening 21, both a first set of ports and openings 233-235 defined by a combination of second inner shell portion 203B of inner shell 225 and second outer shell 203A and a second set of ports and openings 236-238 defined by a combination of the first inner shell portion and the first outer shell in place of additional ports and openings 34-36. The lack of a majority of a rear wall of second outer shell 203A provides a large opening that allows separate display screens to be visible through both the front and the rear of the second outer shell. In some arrangements, a rear wall of second outer shell 203A may cover less than 25%, and preferably less than 15%, of a rear-facing side of a mobile device inserted into a combination of second inner shell portion 203B and second outer shell 203A defining a second cover member of foldable case 201.

Instrument cluster opening 220, as in the example shown and like instrument cluster opening 20 of foldable case 1, may be entirely defined by first outer shell 202A. In some arrangements, instrument cluster opening 220 may be a lens opening as in the example shown that exposes one or more camera lenses of a mobile device or such opening may be but is not limited to being configured to expose one or more camera flashes or other illumination elements, one or more rear-facing microphones, and one or more LIDAR or other navigational or environmental detection sensors. In some alternative arrangements, instead of having lens opening 220, first outer shell 202A may lack at least a majority of a rear wall in the same manner as second outer shell 203A to provide a large opening that allows yet a further separate display screen to be visible through foldable case 1.

Opposing ports 235-238 are configured to receive auxiliary components such as headphone jacks while openings 233, 234 are configured to expose components of the mobile device. As in the example shown, openings 233, 234 may be media openings configured to expose speakers on the mobile device, although in other arrangements such openings in the form shown or upon modification may partially or fully expose microphones, other sensors, or componentry, or such openings may be aligned with antenna keep-out areas. In the example shown, openings 233, 234 each include a plurality of respective dividers 233A, 2234A extending across a width of the ports. Dividers 233A, 234A may be molded with the remainder of second outer shell 203A such that they are integral with the remainder of the second outer shell, i.e., inseparable from the second outer shell without fracture of one or both of the dividers and the remainder of the second outer shell. In the example shown, second inner shell portion 203B surrounds only a periphery of ports 233, 234 such that the second inner shell portion does not extend along dividers 233A, 234A, but in alternative arrangements, the second inner shell portion may extend along any one or all of the dividers as well.

Hinge members 510A, 510B of inner shell 225 operate in the same manner as hinge members 10A, 10B but extend between corners of adjacent left and right sides of first inner shell portion 202B and second inner shell portion 203B, respectively, aligned with respective corners of first outer shell 202A and second outer shell 203A. In this manner, a first cover member formed by the combination of first outer shell 202A and first inner shell portion 202B and a second cover member formed by the combination of second outer shell 203A and second inner shell portion 203B are rotatable, by way of the flexibility of hinge members 510A, 510B, about a lengthwise folding axis defined by the hinge members and extending along the adjacent left and right sides of first inner shell portion and second inner shell portion, respectively.

Figure 9A:
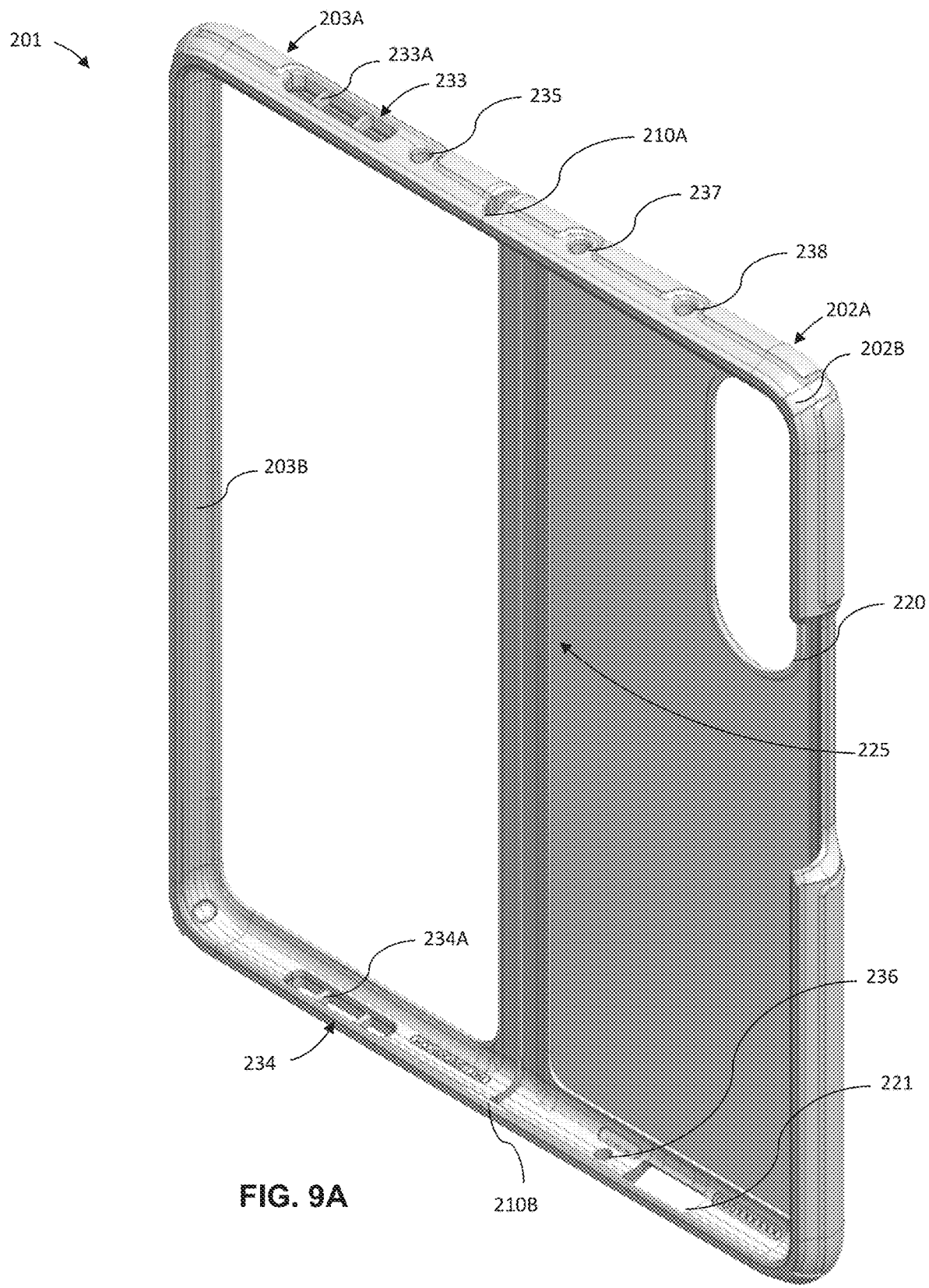
FIG. 9A is a front perspective view of a foldable mobile device case, shown in an open position in accordance with an embodiment.
Figure 9B:
FIGS. 9B and 9C are front and rear views, respectively, of the foldable mobile device case in the open position of FIG. 9A.
Figure 9C:
Figure 9D:
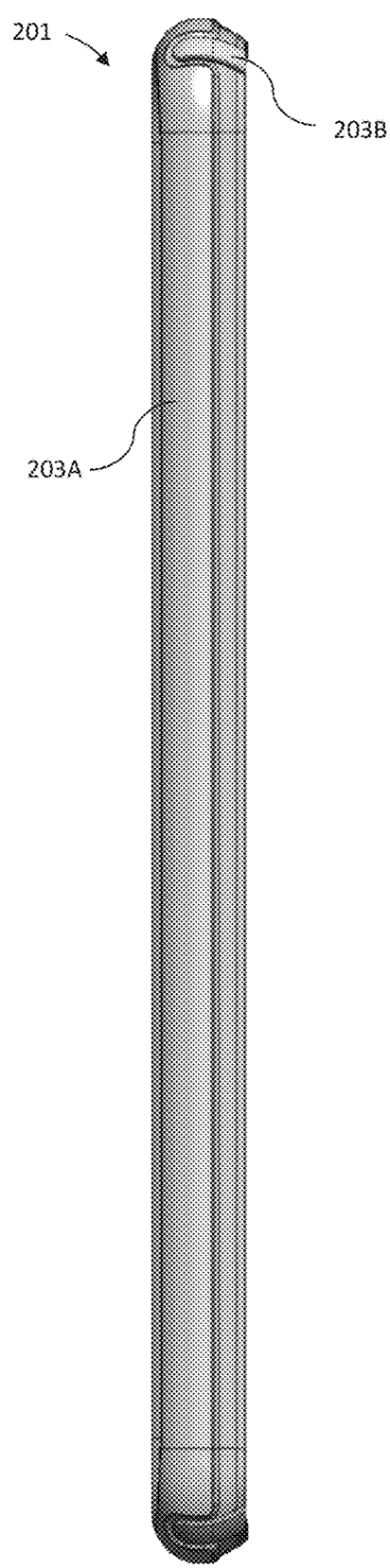
FIGS. 9D and 9E are left side and right side views, respectively, of the foldable mobile device case in the open position of FIG. 9A.
Figure 9E:
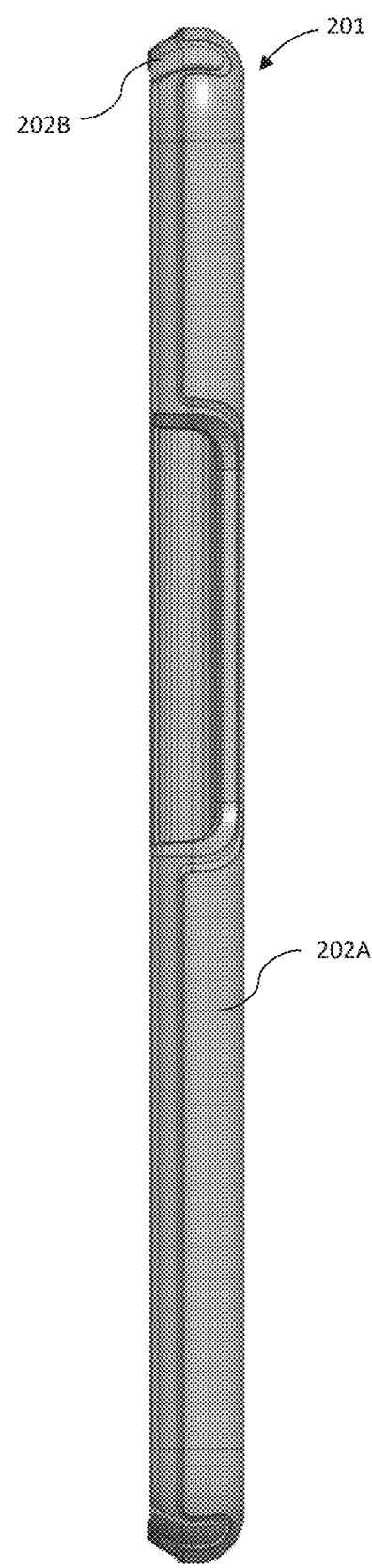
Figure 9F:
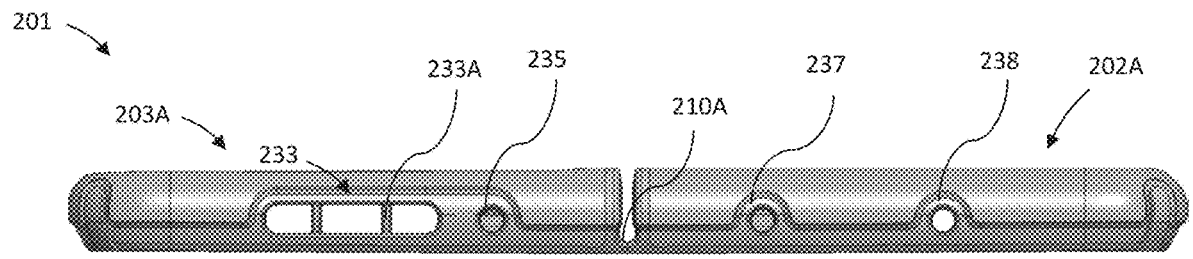
FIGS. 9F and 9G are top and bottom views, respectively, of the foldable mobile device case in the open position of FIG. 9A.
Figure 9G:
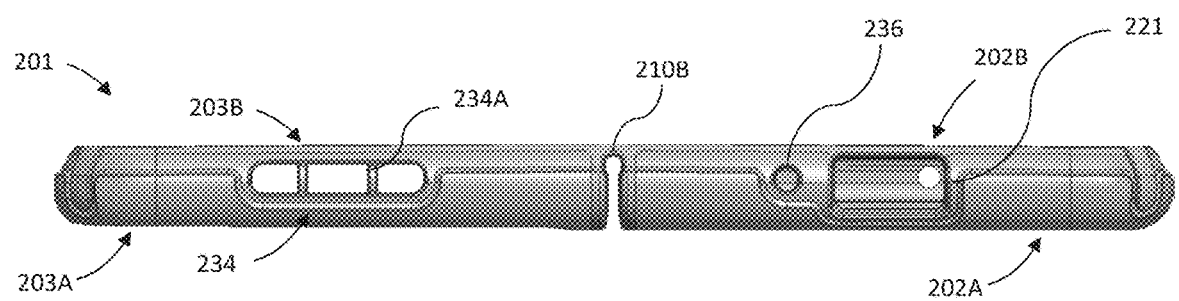

As shown in FIG. 9C, a front side of second outer shell 203A includes adjacent openings 231A, 231B aligned with a cutout of second inner shell portion 203B. In this manner, openings 231A, 231B are configured for alignment with speakers on an inserted mobile device.

Preferred hard/rigid materials, such as for outer shells 2A, 3A, 102A, 103A, 202A, 203A include hardened plastic material, a rigid or semi-rigid plastic material, a rigid/hard rubber material, a polycarbonate material, a metal, an alloy, a para-aramid material, wood, glass, mirror, quartz, and any combination thereof, and may be any color or texture. Flexible components, such as inner shells 25, 125, 225 preferably may be made of elastomeric or other suitably flexible materials. Preferred materials include thermosetting plastics having a hardness of shore 5 D to shore 100 D, PC, poly(methyl methacrylate) ("PMMA"), metals, acrylonitrile butadiene styrene ("ABS"), PMMA, polyethylene terephthalate ("PET"), high durometer TPEs and TPUs having a hardness of shore 30 D to shore 100 D, and any combination thereof. In some arrangements, inner shell 25 may be made of a non-Newtonian dilatant material, as further described in U.S. Patent Application Publication Nos. 2019/0075899 A1 and 2019/0075900 A1, the entireties of the disclosures of which hereby being incorporated herein by reference.

In some arrangements, any one or any combination of surfaces of outer shells 2A, 3A and inner shell 25 exposed to users of foldable case 1 may be treated with an antimicrobial material applied as a coating or any one or combination of the outer shells and the inner shell may have an antimicrobial material embedded into them. Preferred antimicrobial materials include silver or silver alloy (e.g., silver sodium hydrogen zirconium phosphate), copper or copper alloy, organosilanes, quaternary ammonium compounds (e.g., dimethyloctadecyl (3-trimethoxysilyl propyl) ammonium chloride, alkyldimethylbenzylammonium chloride, and didecyldimethylammonium chloride), chlorhexidine, chlorhexidine incorporated hydroxyapatite materials, chlorhexidine-containing polymers (e.g., chlorhexidine-containing polylactide), and antibiotics (e.g., gentamicin, cephalothin, carbenicillin, amoxicillin, cefamandol, tobramycin, vancomycin). Preferred antimicrobial coatings include coatings containing any of the aforementioned antimicrobial materials, chlorhexidine-containing polylactide coatings on an anodized surface, and polymer and calcium phosphate coatings with chlorhexidine. These antimicrobial treatments aid in reducing the presence and preventing the growth of microbes (e.g., bacteria, fungi, viruses, etc.), thereby aiding in preventing the spread of related sicknesses, illnesses, or diseases.

In some alternative arrangements, the flexible shell could be an outer structure and the rigid shells could be received in such a flexible shell. In some such arrangements, the opposing hinge members would remain as part of an integral flexible shell. In some other arrangements, there may be two separate flexible portions formed, such as by co-molding, around the rigid shells in which the opposing hinge members may be formed, such as by co-molding onto the rigid shells. In some alternative arrangements, one or both the flexible inner shell portions of the foldable case may include projections or protrusions extending inwardly toward a center the respective inner shell portions, such as in the manner of those shown and described in U.S. patent application Ser.

No. 17/081,448, the entirety of the disclosure of which hereby being incorporated by reference herein.

In some alternative arrangements, an additional layer or layers, such as that described in U.S. Pat. No. 10,694,825, the entirety of the disclosure of which being incorporated by reference herein, may be added to either one or both first outer shell 2A or second outer shell 3A. In some arrangements, button caps, such as those shown and described in U.S. patent application Ser. No. 17/081,448, optionally may be applied over button covers and exposed for contact with a user of the foldable case (and likewise a user of a case assembly including a mobile device when such mobile device is received in case) in which such caps may be used to cover button covers, e.g., button cover 26, such that the user does not contact the button cover. Such button caps may be held in place between the button covers or corresponding surrounding portions of inner shell 25 and the additional layer or layers added to either one or both first outer shell 2A or second outer shell 3A, as the case may be, by way of a tight fit between inner shell 25 and the corresponding additional layer or layers, which may include a slight compression of the elastomeric inner shell. In such arrangements, the button caps may be translucent, transparent, or clear, and in some such arrangements, a film or print, e.g., an ink coloring, a graphic, or an etching, may be provided between each such button cap and respective button cover such that the film or print is partially or wholly visible to the naked eye through each such button cap.

In some alternative arrangements, any of the ports and openings, e.g., instrument cluster openings 20, 120, 220 and ports and openings 34-36, 134-136, 233-238, may be rearranged, repositioned, reconfigured, augmented with additional similar ports and openings, and be removed depending on the features of a mobile device to be used with the foldable case 1, 101, 201. Moreover, such ports and openings may be configured to pass through either one or both of an outer shell 2A, 3A, 102A, 103A, 202A, 203A and an inner shell 25, 125, 225.

It is noted that the terminology used above is for the purpose of reference only, and is not intended to be limiting. For example, terms such as "upper," "lower," "above," "below," "rightward," "leftward," "clockwise," and "counterclockwise" refer to directions in the drawings to which reference is made. As another example, terms such as "inward" and "outward" may refer to directions toward and away from, respectively, the geometric center of the component described. As a further example, terms such as "front," "rear," "side," "left side," "right side," "top," "bottom," "inner," "outer," "horizontal," and "vertical" describe the orientation of portions of the component within a consistent but arbitrary frame of reference which is made clear by reference to the text and the associated drawings describing the component under discussion. Such terminology will include the words specifically mentioned above, derivatives thereof, and words of similar import.

While this invention has been described in conjunction with the specific embodiments outlined above, it is evident that many alternatives, modifications, and variations will be apparent to those skilled in the art. Indeed, the disclosure set forth herein includes all possible combinations of the particular features set forth above, whether specifically disclosed herein or not. For example, where a particular feature is disclosed in the context of a particular aspect, arrangement, configuration, or embodiment, that feature can also be used, to the extent possible, in combination with and/or in the context of other particular aspects, arrangements, configurations, and embodiments of the invention, and in the invention generally. Moreover, the disclosure set forth herein includes the mirror image, i.e., mirror configuration, taken from any perspective of any drawing or other configuration shown or described herein. Accordingly, the preferred embodiments of the invention as set forth above are intended to be illustrative, not limiting. Various changes may be made without departing from the spirit and scope of the inventions as defined in the following claims.

In addition, it is noted that citation or identification of any document in this application is not an admission that such document is available as prior art to the present invention.

The invention claimed is:

1. A foldable case for removably receiving a separate and distinct foldable mobile electronic device having a front device surface, a rear device surface opposite the front device surface, and a periphery extending between the front device surface and the rear device surface of the device, the case comprising:

first and second cover members including respective first and second rear walls, respective first and second peripheral rims and respective first and second sidewalls extending between the respective rear walls and the respective peripheral rims and thereby defining respective first and second recesses configured for receiving respective first and second portions of the device; and opposing hinge members each extending between adjacent locations at the respective peripheral rims of the first and the second cover members to hingedly connect the first and the second cover members, wherein each of the opposing hinge members is continuous with the first and the second peripheral rims and thereby forms a portion of an outer rim of the foldable case.

2. The foldable case of claim 1, wherein the first rear wall of the first cover member includes a lens opening configured for alignment with and exposure of one or more camera lenses of the device, and wherein a sidewall of the first cover member or the second cover member includes a connector opening configured for alignment with and exposure of an electrical power connector of the device.

3. The foldable case of claim 1, wherein the mobile electronic device includes a first device member hingedly attached to a second device member such that the front and the rear device surfaces are formed by a combination of the first and the second device members, and wherein either one or both of i) the first rear wall is configured such that a majority of the rear device surface of the mobile electronic device formed by the first device member is exposed by the first rear wall and ii) the second rear wall is configured such that a majority of the rear device surface of the mobile electronic device formed by the second device member is exposed by the second rear wall.

4. The foldable case of claim 1, wherein the foldable case is foldable about a widthwise folding axis.

5. The foldable case of claim 1, wherein the foldable case is foldable about a lengthwise folding axis.

6. The foldable case of claim 1, wherein the opposing hinge members and the first and the second peripheral rims form an entirety of the outer rim of the foldable case.

7. A foldable case for removably receiving a separate and distinct foldable mobile electronic device having a front device surface, a rear device surface opposite the front device surface, and a periphery extending between the front device surface and the rear device surface of the device, the case comprising:

first and second cover members including respective first and second rear walls, respective first and second peripheral rims and respective first and second sidewalls extending between the respective rear walls and the respective peripheral rims and thereby defining respective first and second recesses configured for receiving respective first and second portions of the device; and opposing hinge members each extending between adjacent locations at the respective peripheral rims of the first and the second cover members to hingedly connect the first and the second cover members, wherein the first and the second cover members are rotatable relative to each other to a closed position of the case in which the first and the second peripheral rims confront each other and to an open position of the case in which the first and the second peripheral rims face in the same direction, wherein the first rear wall and the first sidewall together form a first end surface of the first cover member and the second rear wall and the second sidewall together form a second end surface of the second cover member, and wherein the first and the second end surfaces of the cover members and the opposing hinge members together define opposing side openings when the case is in the open position, each of the side openings including a first aperture spaced from a respective one of the opposing hinge members and a second aperture bounded by the respective one of the opposing hinge members and extending from the respective one of the first apertures, the second aperture being wider along a portion thereof than the respective one of the first apertures.

8. The foldable case of claim 7, wherein the first and the second end surfaces define a channel extending between the first and the second cover members when the case is in the open position, and wherein the end surfaces of both of the first and the second cover members together with both of the opposing hinge members define an end opening configured for receiving the device therethrough when the case is in the closed position.

9. A foldable case for removably receiving a separate and distinct mobile electronic device having a front device surface, a rear device surface opposite the front device surface, and a periphery extending between the front device surface and the rear device surface of the device, the case comprising:

first and second shells including respective first and second shell rear walls and respective first and second shell sidewalls extending from the respective shell rear walls;

flexible first and second cover portions including respective first and second cover rear walls and respective first and second cover sidewalls extending from the respective cover rear walls, the first and the second shells being combined with the first and the second cover portions, respectively, to form respective first and second cover members defining respective first and second recesses configured for receiving respective first and second portions of the device; and opposing first and second hinge members, the first hinge member extending between first and second adjacent locations of the first and the second cover members and the second hinge member extending between third and fourth adjacent locations of the first and the second cover members to hingedly connect the first and the second cover members such that a combination of the first and the second cover members and the first and the second hinge members collectively form an outer rim of the case, each of the first, the second, the third, and the fourth locations being on the outer rim of the case.

10. The foldable case of claim 9, wherein the first shell is integral with the first cover portion to form the first cover member, the second shell is integral with the second cover portion to form the second cover member, and each of the first and the second hinge members are integral with the first and the second cover members to form a one-piece structure.

11. The foldable case of claim 9, wherein the first and the second hinge members are each directly attached to the first and the second cover portions.

12. The foldable case of claim 9, wherein the first and the second hinge members are each directly attached to the first and the second shells.

13. The foldable case of claim 9, wherein the first and the second shells are rigid.

14. The foldable case of claim 9, wherein at least majorities of each of the first and the second cover portions lie within respective first and second pockets formed by the first and the second shells, respectively.

15. The foldable case of claim 14, wherein the first and the second cover portions form respective first and second rear wall openings exposing respective first and second inner surfaces of the first and the second shell rear walls, respectively.

16. The foldable case of claim 9, wherein at least majorities of each of the first and the second shells lie within respective first and second pockets formed by the first and the second cover portions, respectively.

17. The foldable case of claim 9,
wherein each of the first and the second shell sidewalls extend to respective first and second shell peripheral rims and each of the first and the second cover sidewalls extend to respective first and second cover peripheral rims that extend beyond and overlie the first and the second shell peripheral rims, respectively, or
wherein each of the first and the second cover sidewalls extend to respective ones of the first and the second cover peripheral rims and each of the first and the second shell sidewalls extend to respective ones of the first and the second shell peripheral rims that extend beyond and overlie the first and the second cover peripheral rims, respectively.

18. The foldable case of claim 9, wherein opposing corners of each of the first and the second shells include cutouts, and wherein respective flange portions of the first and the second cover portions extend through the cutouts.

19. The foldable case of claim 9, wherein the first shell rear wall, the first cover rear wall, the first shell sidewall, and the first cover sidewall together form a first end surface of the first cover member and the second shell rear wall, the second cover rear wall, the second shell sidewall, and the second cover sidewall together form a second end surface of the second cover member, and wherein the first cover portion extends along an entirety of the length of the first end surface and the second cover portion extends along an entirety of the length of the second end surface.

20. The foldable case of claim 9,
wherein the first and the second cover members are rotatable relative to each other to a closed position of the case in which a first section of the outer rim formed by the first cover member confronts a second section of the outer rim formed by the second cover member and to an open position of the case in which the first section of the outer rim and the second section of the outer rim face in the same direction, and wherein the first shell rear wall, the first cover rear wall, the first shell sidewall, and the first cover sidewall together form a first end surface of the first cover member and the second shell rear wall, the second cover rear wall, the second shell sidewall, and the second cover sidewall together form a second end surface of the second cover member, and wherein the first and the second end surfaces and the first and the second hinge members together define a channel when the case in the open position.

21. The foldable case of claim 9, wherein the first and the second cover members are rotatable relative to each other to a closed position of the case in which a first section of the outer rim formed by the first cover member confronts a second section of the outer rim formed by the second cover member and to an open position of the case in which the first section of the outer rim and the second section of the outer rim face in the same direction, wherein the first shell rear wall, the first cover rear wall, the first shell sidewall, and the first cover sidewall together form a first end surface of the first cover member and the second shell rear wall, the second cover rear wall, the second shell sidewall, and the second cover sidewall together form a second end surface of the second cover member, and wherein the first and the second end surfaces of the cover members and the first and the second hinge members together define opposing side openings when the case is in the open position, each of the side openings including a first aperture spaced from a respective one of the hinge members and a second aperture bounded by the respective one of the hinge members and extending from the respective one of the first apertures, the second aperture being wider along a portion thereof than the respective one of the first apertures.

22. The foldable case of claim 9, wherein the mobile electronic device includes a first device member hingedly attached to a second device member such that the front and the rear device surfaces are formed by a combination of the first and the second device members, and wherein either one or both of i) the first shell rear wall is configured such that a majority of the rear device surface of the mobile electronic device formed by the first device member is exposed by the first shell rear wall and ii) the second shell rear wall is configured such that a majority of the rear device surface of the mobile electronic device formed by the second device member is exposed by the second shell rear wall.

23. The foldable case of claim 9, wherein the foldable case is foldable about a widthwise folding axis.

24. The foldable case of claim 9, wherein the foldable case is foldable about a lengthwise folding axis.

25. A foldable case for removably receiving a separate and distinct mobile electronic device having a front device surface, a rear device surface opposite the front device surface, and a periphery extending between the front device surface and the rear device surface of the device, the case comprising:

rigid first and second outer shells including respective first and second outer rear walls, respective first and second outer peripheral rims, and respective first and second outer sidewalls extending between the respective outer rear walls and the respective outer peripheral rims; and an inner shell including a pair of struts and flexible first and second inner shell portions each integrally connected to each of the pair of struts to form a one-piece structure, the first and the second inner shell portions including respective first and second inner rear walls, respective first and second inner peripheral rims, and respective first and second inner sidewalls extending between the respective inner rear walls and the respective inner peripheral rims to form respective first and second recesses each configured for receiving respective first and second portions of the device, wherein the first and the second inner peripheral rims extend beyond and overlie the first and the second outer peripheral rims, respectively, wherein the first and the second inner shell portions are integral with and cover the first and the second outer shells, respectively, to form first and second cover members, and wherein each of the struts is flexible such that the first and the second cover members are hingedly connected.

26. The foldable case of claim 25, wherein the inner peripheral rims are integral with and aligned with each of the struts to define an outer rim of the case.

27. The foldable case of claim 25, wherein the inner shell is co-molded onto the first and the second outer shells.

* * * * *